US007764584B2

(12) United States Patent
Hara et al.

(10) Patent No.: US 7,764,584 B2
(45) Date of Patent: Jul. 27, 2010

(54) REPRODUCING APPARATUS, REPRODUCING METHOD, RECORDING AND REPRODUCING APPARATUS, RECORDING AND REPRODUCING METHOD, RECORDING APPARATUS, AND RECORDING METHOD

(75) Inventors: Masaaki Hara, Tokyo (JP); Kenji Tanaka, Tokyo (JP); Kazuyuki Hirooka, Gunma (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 11/866,857

(22) Filed: Oct. 3, 2007

(65) Prior Publication Data

US 2008/0297865 A1    Dec. 4, 2008

(30) Foreign Application Priority Data

Oct. 18, 2006    (JP)   ............................ 2006-283587

(51) Int. Cl.
*G11B 7/00* (2006.01)
(52) U.S. Cl. ...................................................... 369/103
(58) Field of Classification Search ................... None
See application file for complete search history.

(56) References Cited

U.S. PATENT DOCUMENTS

| 7,310,173 | B2 * | 12/2007 | Tanaka et al. | 359/21 |
| 7,626,914 | B2 * | 12/2009 | Tonami | 369/103 |
| 2004/0001400 | A1 * | 1/2004 | Amble et al. | 369/44.26 |
| 2006/0072421 | A1 * | 4/2006 | Tanaka et al. | 369/103 |
| 2006/0285469 | A1 * | 12/2006 | Tonami | 369/103 |

FOREIGN PATENT DOCUMENTS

| JP | 08-171620 | 7/1996 |
| JP | 2004-310957 | 11/2004 |
| JP | 2006-065272 | 3/2006 |
| JP | 2006 196044 | 7/2006 |
| WO | 2005/098830 | 10/2005 |

OTHER PUBLICATIONS

Hideyoshi Horimai, "Holographic media to be taken off soon, 200G bite is realized in 2006", Nikkei Electronics, Japan, Jan. 17, 2005, No. 891, p. 105-114.

* cited by examiner

*Primary Examiner*—Peter Vincent Agustin
(74) *Attorney, Agent, or Firm*—K&L Gates LLP

(57) ABSTRACT

A reproducing apparatus, reproducing method, recording and reproducing apparatus, recording and reproducing method, recording apparatus, and recording method are provided. A reproducing apparatus reproduces data from a hologram recording medium in which data inserted with syncs at predetermined intervals is recorded in each predetermined page unit by interference fringes of reference light and signal light includes a reference-light irradiating unit that irradiates the reference light on the hologram recording medium, a signal readout unit that receives diffractive light corresponding to the data recorded on the hologram recording medium, a sync-position detecting unit that detects a position of a detection object sync on the basis of positions of plural syncs selected with the position of the detection object sync as a reference, and an amplitude-value calculating unit that specifies positions of respective recording pixels in the readout signal on the basis of the positions of the respective syncs detected by the sync-position detecting unit and calculates amplitude values of the respective pixels.

16 Claims, 23 Drawing Sheets

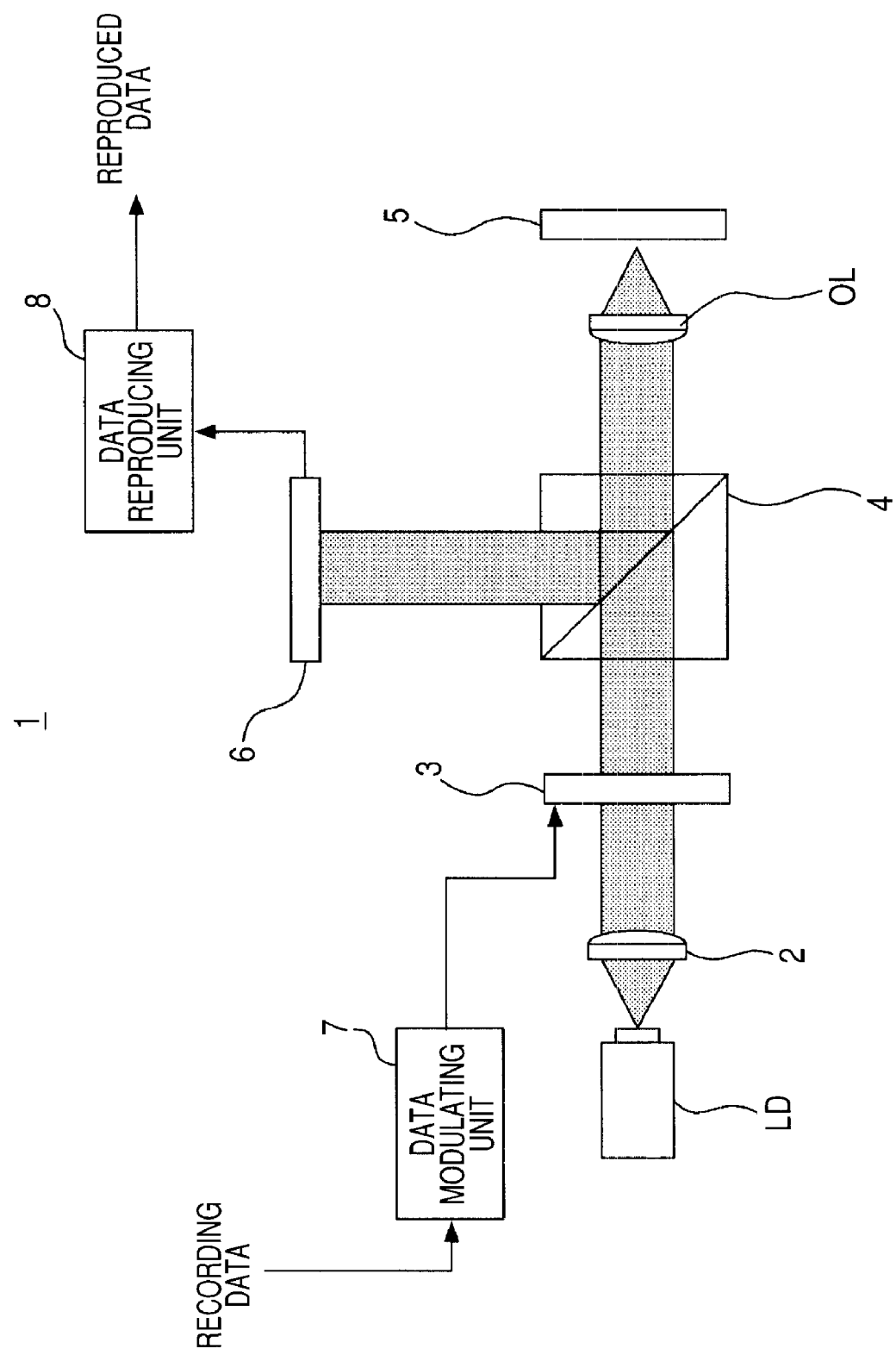

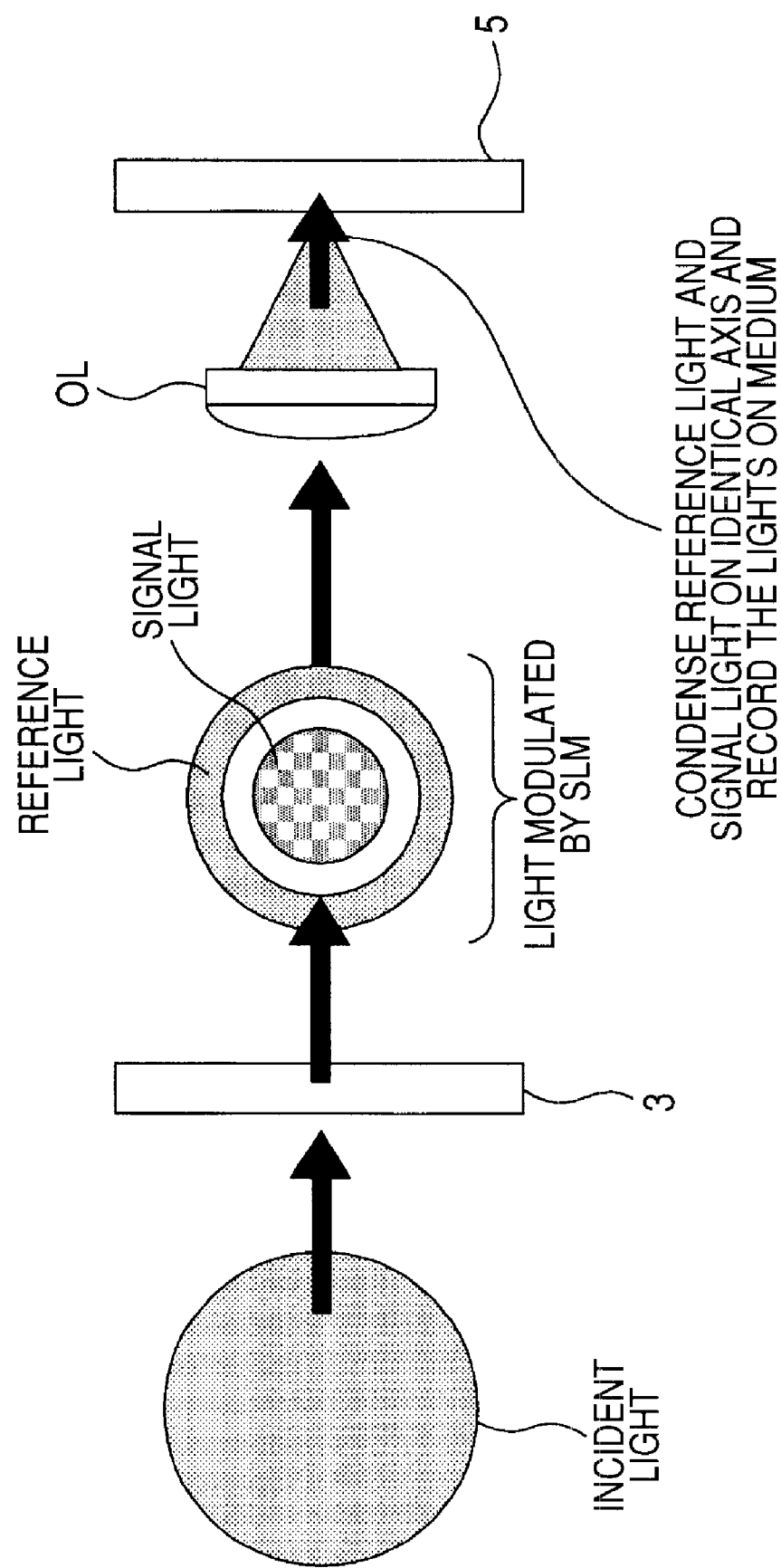

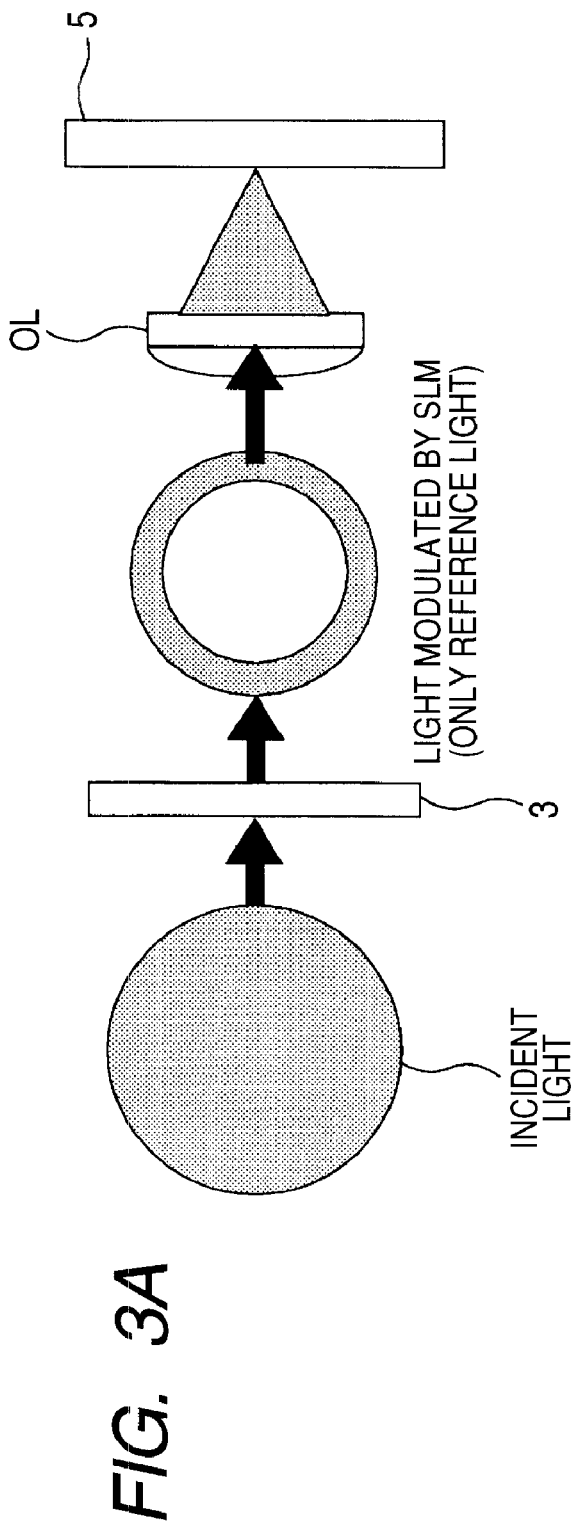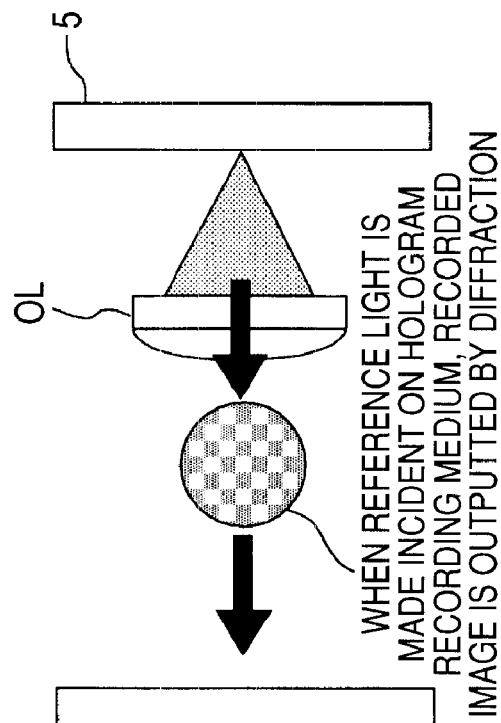

MINIMUM UNIT OF LAYING = 1 SYMBOL

SYNC PATTERN

SYNC INTERVALS

DISTRIBUTION OF SYNCS

1 SYMBOL: 4 BITS × 4 BITS
SUB-PAGE: 6 SYMBOLS × 6 SYMBOLS
(AMONG SYMBOLS, 1 SYMBOL IS SYNC)
SIGNAL LIGHT AREA RADIUS: 154 PIXELS
INTERVALS OF SYNCS: 24 PIXELS

NUMBER OF SYMBOLS IN 1 PAGE: 4513 SYMBOLS (BYTES)
[1.27 TIMES AS LARGE AS THAT IN THE PAST]

DISTRIBUTION OF SYNCS

1 SYMBOL: 4 BITS × 4 BITS
SUB-PAGE: 6 SYMBOLS × 6 SYMBOLS
(AMONG SYMBOLS, 1 SYMBOL IS SYNC)
SIGNAL LIGHT AREA RADIUS: 154 PIXELS
INTERVALS OF SYNCS: 48 PIXELS

NUMBER OF SYMBOLS IN 1 PAGE: 4609 SYMBOLS (BYTES)
[1.30 TIMES AS LARGE AS THAT IN THE PAST]

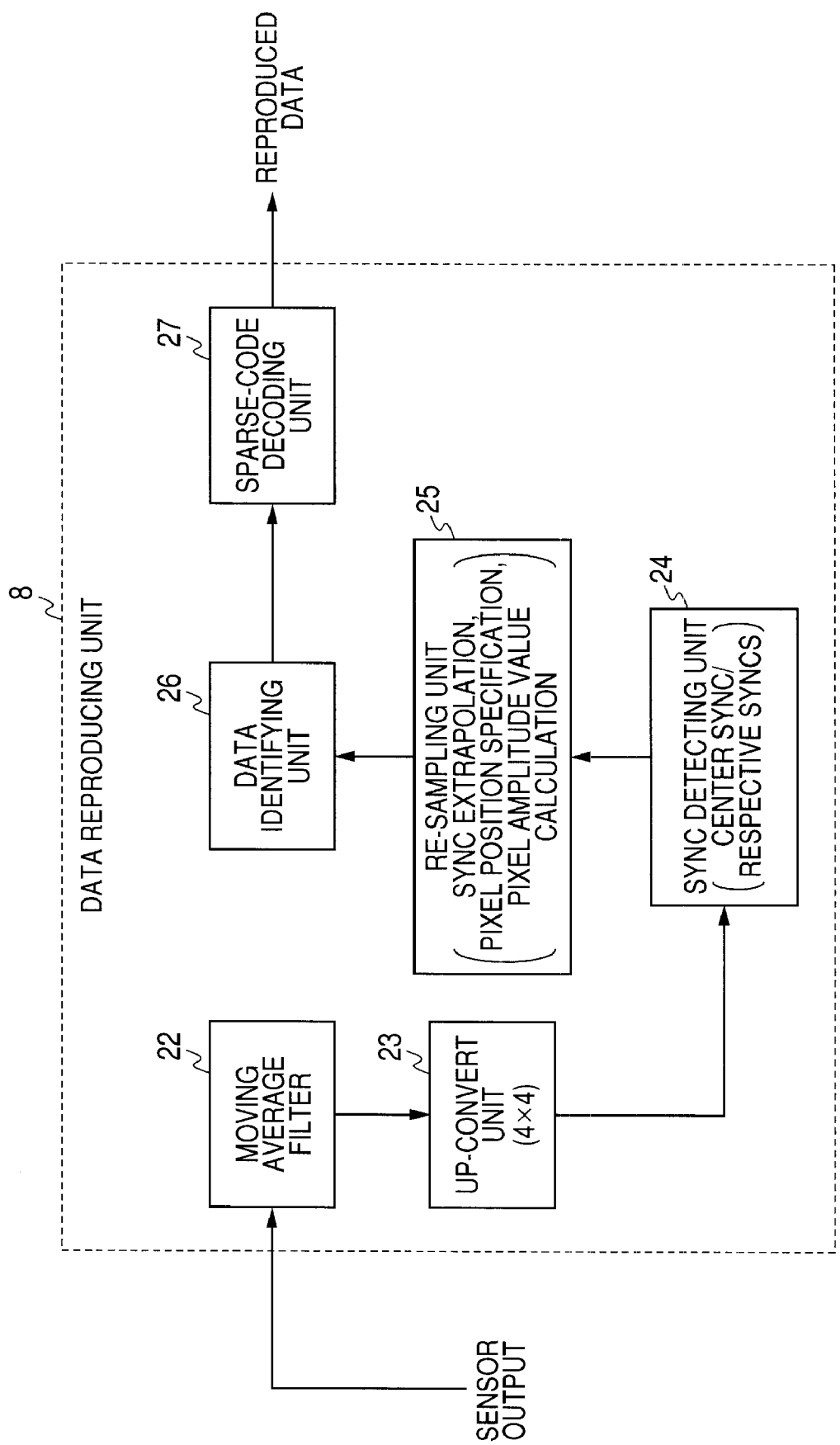

SER (1:4) = 2.06E-002 = 96/4657
SER (2:4) = 1.92E-002 = 88/4586
SER (3:4) = 8.92E-003 = 38/4262
SER (4:4) = 3.64E-003 = 14/3850

SER (1:4) == 6.44E-002 = 300/4657

SER (1:4) = 6.44E-002 = 300/4657
SER (2:4) = 6.37E-002 = 292/4586
SER (3:4) = 5.09E-002 = 217/4262
SER (4:4) = 4.31E-002 = 166/3850

SER (1:4) == 2.06E-002 = 96/4657

SER (1:4) = 2.06E-002 = 96/4657
SER (2:4) = 1.92E-002 = 88/4586
SER (3:4) = 8.92E-003 = 38/4262
SER (4:4) = 4.16E-003 = 16/3850

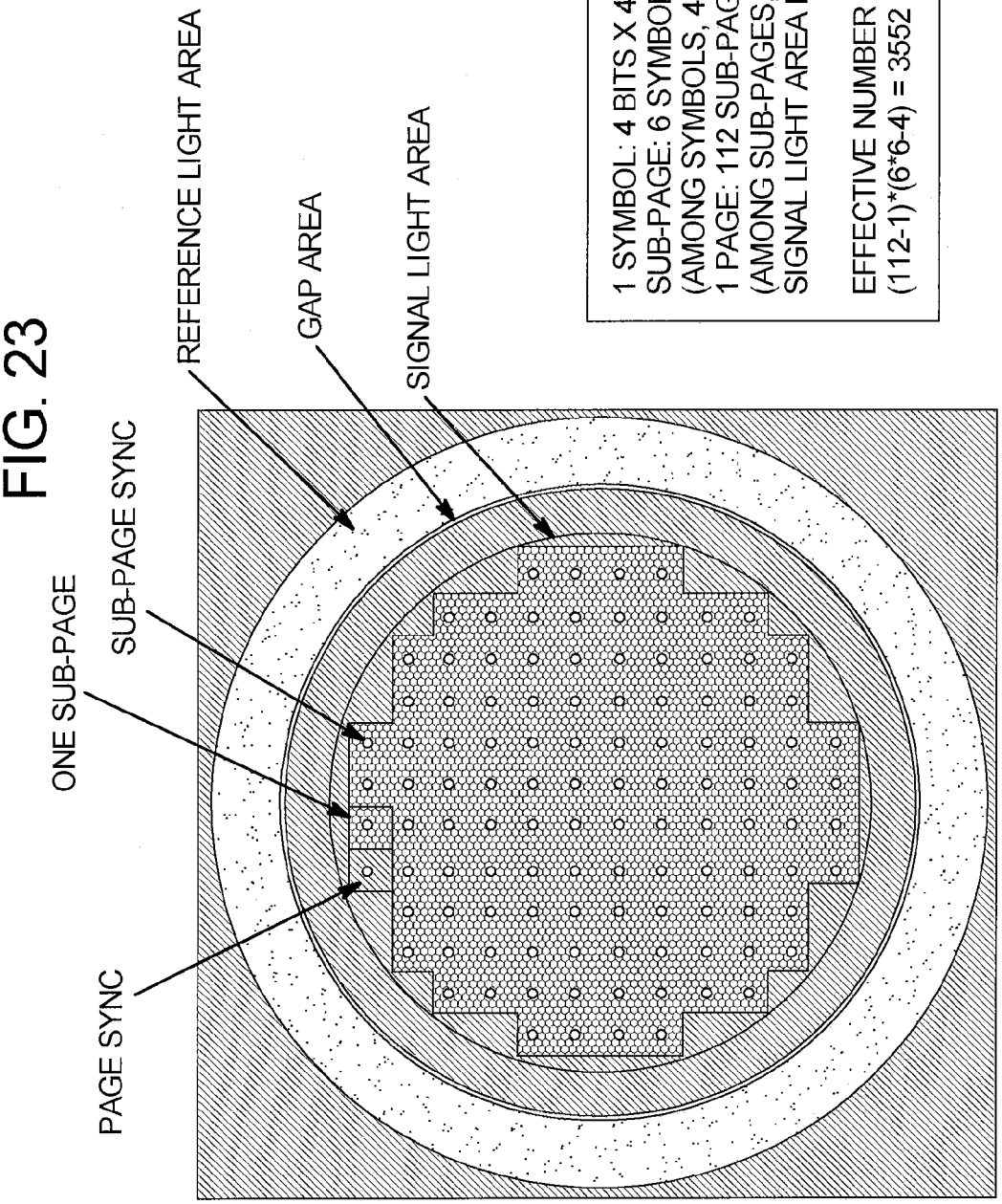

REPRODUCING APPARATUS, REPRODUCING METHOD, RECORDING AND REPRODUCING APPARATUS, RECORDING AND REPRODUCING METHOD, RECORDING APPARATUS, AND RECORDING METHOD

CROSS-REFERENCES TO RELATED APPLICATIONS

The present application claims priority to Japanese Patent Application JP 2006-283587 filed in the Japanese Patent Office on Oct. 18, 2006, the entire contents of which is being incorporated herein by reference.

BACKGROUND

The present application relates to a reproducing apparatus and a reproducing method for reproducing data from a hologram recording medium on which data in predetermined page units is recorded by interference fringes of reference light and signal light. The present application relates to a recording and reproducing apparatus and a recording and reproducing method for recording data in and reproducing data from such a hologram recording medium. Further, the present application relates to a recording apparatus and a recording method for recording data on such a hologram recording medium.

In a hologram recording and reproducing system, in particular, a hologram recording and reproducing system in the field of optical storage systems, an SLM (Spatial Light Modulator) such as a transmission liquid crystal panel or a DMD (Digital Micro mirror Device) is used for light intensity modulation. The SLM applies intensity modulation for obtaining a pattern array of bit 1 (e.g., light intensity is high) and bit 0 (e.g., light intensity is low) to signal light.

For example, as shown in FIG. 2, the SLM applies light intensity modulation to light in the center thereof according to recording data to generate signal light and transmits the light in a ring shape around the signal light to generate reference light. The signal light modulated according to the recording data is irradiated on a hologram recording medium together with the reference light. Consequently, interference fringes of the signal light and the reference light are recorded on the hologram recording medium.

During reproduction of data, the SLM generates only the reference light and irradiates the reference light on the hologram recording medium to obtain diffractive light corresponding to the interference fringes. An image corresponding to the diffractive light is focused on an image sensor such as a CCD (Charge Coupled Device) sensor or a CMOS (Complementary Metal Oxide Semiconductor) sensor to obtain amplitude values of respective recording pixels (i.e., respective pixels of the SLM). Reproduced data is obtained on the basis of the amplitude values of the respective pixels.

The hologram recording and reproducing system for irradiating the signal light and the reference light on an identical optical axis in this way is known as a coaxial system. When the coaxial system is adopted, it is extremely difficult to strictly set respective pixels of the SLM and respective pixels of the image sensor in a one to one relation because of optical distortion, a magnification, and the like. In other words, it is extremely difficult to precisely make reproduced light corresponding to the respective pixels of the SLM incident on assumed respective pixels on the image sensor.

Thus, during recording, in arraying data in signal light, predetermined pattern data called syncs are inserted at predetermined intervals and, during reproduction, alignment based on positions of the syncs is performed and, then, calculation of amplitude values of the respective pixels is performed.

By inserting the syncs in this way and aligning the positions of the syncs and positions where patterns of the syncs are actually detected, it is possible to correct deviation of reproduced light from an ideal incidence position due to optical distortion and the like and realize an appropriate readout operation.

However, the deviation of an incidence position does not always occur in a unit of one pixel. It is anticipated that the deviation occurs in a unit smaller than a pixel as well. When the deviation in a unit smaller than a pixel occurs, it is difficult to perform accurate detection of the syncs for performing alignment. This makes it difficult to perform not only data readout but also alignment.

Therefore, to make it possible to cope with such deviation in a unit smaller than a pixel, for example, the number of pixels of the image sensor is set to n time (at least 4 (2×2) times) as large as the number of pixels to improve a resolution of the image sensor for reproduced light for one pixel of the SLM.

For example, in a general method in the past, the reproduced light for one pixel of the SLM is received by 4 (2×2) pixels on the image sensor (2×2 over-sampling). Consequently, it is possible to obtain a resolution of the image sensor four times as high as that of one pixel of the SLM.

In the technique in the past, in order to further improve accuracy, for example, respective values obtained by the 2×2 over-sampling are interpolated to further perform 2×2 up-convert (up-convert to a pixel size of 4×4). In other words, by performing the up-convert to a pixel size of 4×4, it is possible to increase the resolution of the image sensor to be sixteen times as high as that of one pixel of the SLM.

For example, it is possible to perform correction of readout positions of the respective pixels by a unit smaller than a pixel according to such a method. Thus, it is possible to appropriately perform calculation of amplitude values of the pixels.

When it is assumed that each of the pixels of the image sensor outputs a reception signal level in, for example, gradations of 0 to 255, an amplitude value corresponding to a bit value "0" is, for example, about "64" and an amplitude value corresponding to a bit value "1" is, for example, about "192".

Therefore, if an amplitude value of a position of each of the pixels specified after the positional correction with the syncs (in this case, sixteen values after the over-sampling and up-convert correspond to one pixel of the SLM) is about "64", a bit value of the position can be judged as "0". If the amplitude value is about "192", a bit value of the position can be judged as "1".

By performing such detection of a position of a pixel and calculation of an amplitude value of the detected pixel position for all pixel positions, it is possible to reproduce data recorded on the hologram recording medium as a modulation pattern in the SLM.

FIG. 23 and FIGS. 24A and 24B are diagrams for explaining an example of a specific recording data format adopted in the hologram recording and reproducing method in the past.

FIG. 23 schematically shows a modulation pattern in the SLM. FIGS. 24A and 24B show examples of patterns of syncs inserted in recording data.

As it is understood from the above explanation, in the case of the coaxial system, it is necessary to irradiate reference light during recording. Thus, as shown in FIG. 23, a reference light area for generating this reference light is defined in an outermost peripheral portion of the SLM.

In an inner peripheral side portion of this reference light area, a signal light area in which a pattern recorded on the hologram recording medium should actually be formed is defined across a gap area shown in the figure.

During recording, a data pattern in this signal light area is sequentially changed and data recording on the hologram recording medium is performed. A volume of data recorded at a time by interference with the reference light is a volume of data that is laid in the signal light area. A unit of data recording performed by interference at a time in this way (i.e., a unit of a volume of data laid in the signal light area) is called "page".

Data units other than this "page" are defined. For example, 4 bits×4 bits is called "symbol". Besides this "symbol", 6 symbols×6 symbols (i.e., 24 bits×24 bits) is called "sub-page".

In FIG. 23, in the technique in the past, in forming data as one page, data is laid in the circular signal light area with one sub-page as a minimum unit as shown in the figure.

In laying the data, syncs are inserted at predetermined intervals. In the technique in the past, a page sync shown in the figure is inserted at the top (in this case, a position at the left end at the uppermost stage) of each page.

This page sync is a sync used for performing rough alignment of entire one page.

For the page sync, as shown in FIG. 24A, one sub-page is allocated. As a data pattern of the sub-page, as shown in the figure, a pattern in which all bits of 4 bits×4 bits (bits for 1 symbol) in the center of 4 (2×2) symbols located in the center of one sub-page are set as "1" and all bits other than the bits are set as "0" is defined. In this case, data patterns for the 4 symbols in the center are as follows:
"00000000
00000000
00111100
00111100
00111100
00111100
00000000
00000000".

All the other bits in the sub-page are "0".

Moreover, in one page, a sub-page sync shown in FIG. 24B is given to each sub-page set as a minimum unit of data laying as described above.

As this sub-page sync, a pattern same as the 4 symbols in the center of the page sync described above is inserted with respect to the 4 symbols in the center in one sub-page.

This sub-page sync is used for final alignment during calculation of an amplitude value of a pixel. When an amplitude value of each pixel is calculated in each sub-page, a position of an object pixel is specified with a position of the sub-page sync as a reference, an amplitude value of the specified pixel position is calculated, and, then, the data is identified as a final bit value of "0" or "1".

In this way, in the format in the past, the data is laid in the signal light area with one sub-page (24 bits×24 bits) as a minimum laying unit. Concerning the syncs, the page sync (for one sub-page) is inserted for each page and the sub-page sync (for 4 symbols) is inserted for each sub-page in one page.

With such a format, in the technique in the past, it is possible to pack user data (data other than the syncs) for 3552 symbols as the number of effective symbols in a signal light area with a radius of 154 pixels (pixel is one pixel of the SLM) as shown in FIG. 23. In other words, an effective capacity for one page is 3552 symbols.

As one of techniques in the past related to the present application, there is JP-A-2006-196044.

SUMMARY

In the technique in the past, data is recorded on and reproduced from the hologram recording medium on the basis of the format described above. However, under the present situation, it can be said that, in particular, a recording and reproducing technique for a hologram recording medium in the field of storage systems is at a stage before practical use and the recording and reproducing method described above is still at a stage of development. Thus, further improvement should be realized for the recording and reproducing method for the hologram recording medium.

Therefore, it is desirable to provide a reproducing apparatus, a recording and reproducing apparatus, and a recording apparatus described below.

According to an embodiment, there is provided a reproducing apparatus that reproduces data from a hologram recording medium in which data inserted with syncs at predetermined intervals is recorded in each predetermined page unit by interference fringes of reference light and signal light. The reproducing apparatus includes reference-light irradiating means for irradiating the reference light on the hologram recording medium.

The reproducing apparatus further includes signal readout means for receiving diffractive light corresponding to the data recorded on the hologram recording medium, which is obtained by the irradiation of the reference light on the hologram recording medium, and obtaining a readout signal.

The reproducing apparatus further includes sync-position detecting means for detecting, in detecting positions of the syncs that should be inserted in the readout signal obtained by the signal readout means, a position of a detection object sync on the basis of positions of plural syncs selected with the position of the detection object sync as a reference.

The reproducing apparatus further includes amplitude-value calculating means for specifying positions of respective recording pixels in the readout signal on the basis of the positions of the respective syncs detected by the sync-position detecting means and calculating amplitude values of the respective pixels.

According to another embodiment, there is provided a recording and reproducing apparatus that records data on and reproduces data from a hologram recording medium in which data in each predetermined page unit is recorded by interference fringes of reference light and signal light. The recording and reproducing apparatus includes recording means for performing spatial light modulation corresponding to a data pattern formed by recording data and syncs inserted in the recording data at predetermined intervals to generate the signal light and irradiating the signal light and the reference light on the hologram recording medium to record the data on the hologram recording medium.

The recording and reproducing apparatus further includes reference-light irradiating means for irradiating the reference light on the hologram recording medium and signal readout means for receiving diffractive light corresponding to the data recorded on the hologram recording medium, which is obtained by the irradiation of the reference light on the hologram recording medium, and obtaining a readout signal.

The recording and reproducing apparatus further includes sync-position detecting means for detecting, in detecting positions of the syncs that should be inserted in the readout signal obtained by the signal readout means, a position of a detection object sync on the basis of positions of plural syncs selected with the position of the object sync as a reference and amplitude-value calculating means for specifying positions of respective recording pixels in the readout signal on the basis of the positions of the respective syncs detected by the sync-position detecting means and calculating amplitude values of the respective pixels.

As described above, in detecting respective syncs in a page, if the syncs are detected using plural syncs selected with an object sync as a reference, it is possible to more accurately specify positions of the respective syncs compared with the apparatus in the past that detects syncs using only one sync.

If the accuracy of detection of sync positions is improved in this way, it is possible to effectively perform sync detection even when a ratio of syncs to be inserted is reduced (e.g., intervals among syncs are increased). In other words, according to the embodiments, it is possible to effectively perform sync detection even when sync intervals are increased to increase a data volume. As a result, it is possible to increase a data volume according to an embodiments.

According to still another embodiment, there is provided a recording apparatus that records data on a hologram recording medium in which data in each predetermined page unit is recorded by interference fringes of reference light and signal light. The recording apparatus includes encoding means for applying predetermined record encoding to recording data and converting the recording data into data in predetermined symbol units.

The recording apparatus further includes recording means for generating signal light in which data is laid with data in the symbol units as a minimum laying unit and irradiating the signal light and the reference light on the hologram recording medium to record data on the hologram recording medium.

If a minimum data unit for laying data in signal light (a minimum laying unit) is set as a symbol unit that is a minimum unit for record encoding, in the circular signal light, it is possible to lay data larger in number than data laid in a unit of one sub-page (including plural symbols) that is a minimum laying unit in the past. Consequently, it is possible to increase a recording data volume.

In the technique in the past in which the minimum laying unit is the sub-page unit, since the minimum laying unit is large, a minimum unit that can be increased or decreased for a radius of the signal light area is also large. Therefore, it is difficult to secure a degree of freedom of a value that can be set as the radius of the signal light area when a recording format is decided. However, according to the embodiments in which a symbol smaller than the sub-page is set as a minimum laying unit, it is possible to make it easier to adjust the number of data laid in the radius direction. Therefore, according to the embodiments, it is possible to remarkably increase a degree of freedom in setting a radius value of the signal light area when a recording format is decided.

As described above, according to an embodiment, it is possible to increase a recording data volume recorded on the hologram recording medium.

In particular, in the recording apparatus (the recording method) according to an embodiment, compared with the technique in the past in which the minimum laying unit is the sub-page unit, it is possible to remarkably increase a degree of freedom in setting a radius value of the signal light area when a recording format is decided. Consequently, it is possible to more easily optimize the recording format.

Additional features and advantages are described herein, and will be apparent from, the following Detailed Description and the figures.

BRIEF DESCRIPTION OF THE FIGURES

FIG. 1 is a block diagram showing an internal structure of a recording and reproducing apparatus according to an embodiment;

FIG. 2 is a diagram for explaining a method of recording data on a hologram recording medium;

FIGS. 3A and 3B are diagrams for explaining a method of reproducing data from the hologram recording medium;

FIG. 19 is a block diagram showing a structure of a signal processing unit for performing a reproducing operation based on a reproducing method according to an embodiment;

FIG. 23 is a diagram for explaining a specific example of a recording data format adopted in the recording and reproducing method in the past and schematically showing a modulation pattern in the spatial light modulator.

DETAILED DESCRIPTION

Figure 4:
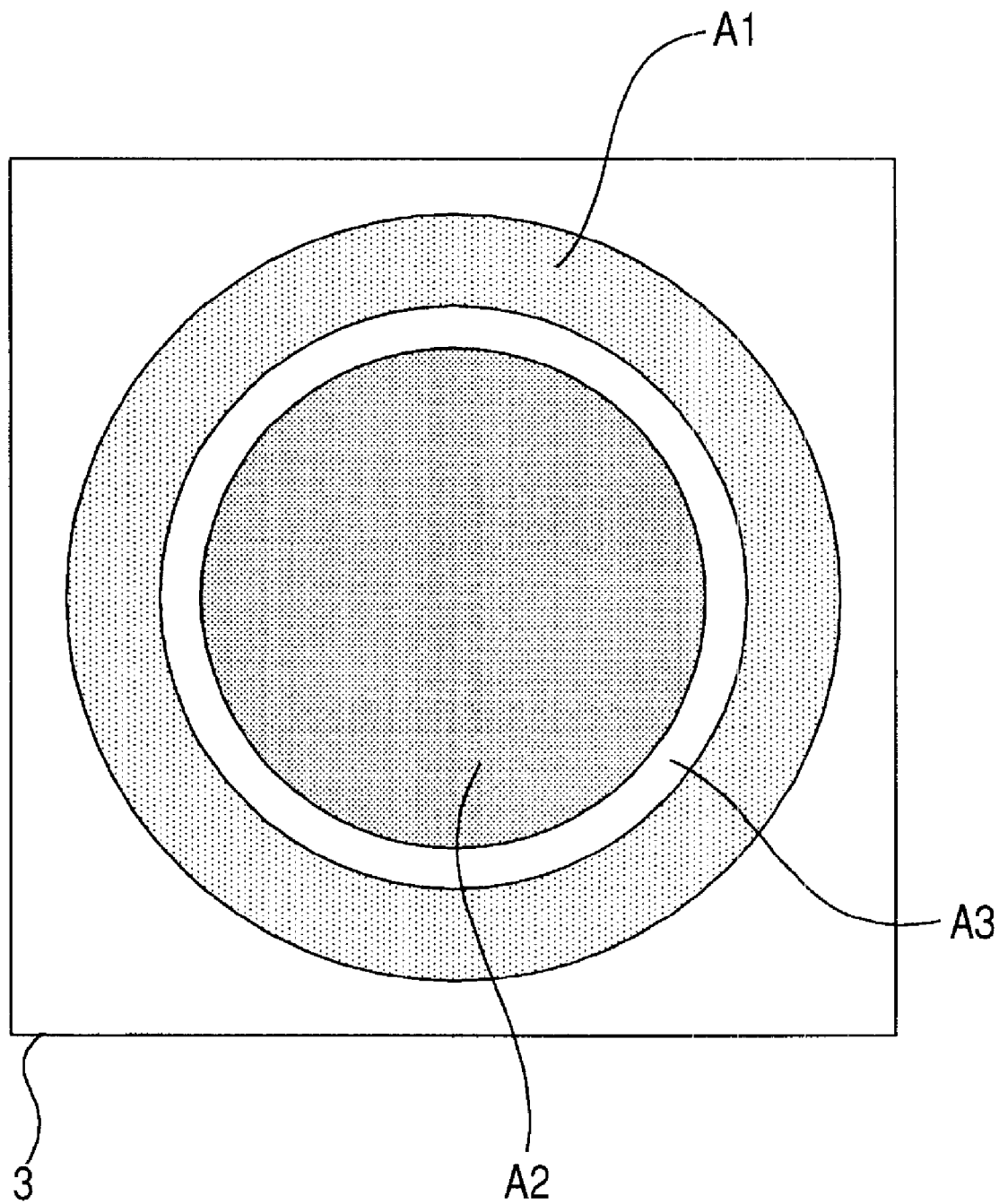
FIG. 4 is a diagram for explaining areas including a reference light area, a signal light area, and a gap area defined on a spatial light modulator.

The present application will be described below in greater detail according to an embodiment with reference to the drawings.

Explanation is made in the following order.
1. Structure of a recording and reproducing apparatus
2. Hologram recording and reproducing method in the past
3. Recording method according to an embodiment
3-1. Recording format
3-2. Recording order
3-3. Structure of a signal processing unit
4. Reproducing method according to the embodiment
4-1. Overview of the reproducing method
4-2. Specific example of the reproducing method
4-3. Structure of a signal processing unit
5. Results of experiments
1. Structure of a Recording and Reproducing Apparatus FIG. 1 is a block diagram showing the internal structure of a recording and reproducing apparatus (a recording and reproducing apparatus 1) according to an embodiment. In FIG. 1, the structure of an optical system, a recording data modulating system, and a reproducing system of the recording and reproducing apparatus 1 is mainly shown. Other components of the recording and reproducing apparatus 1 are not shown.

In this embodiment, a so-called coaxial system is adopted as a hologram recording and reproducing system. In the coaxial system, signal light and reference light are arranged on an identical axis, both the signal light and the reference light are irradiated on a hologram recording medium 5 to record data using interference fringes, and, during reproduction, only the reference light is irradiated on the hologram recording medium 5 to reproduce the data recorded by the interference fringes.

In this case, the hologram recording medium 5 in the figure is a so-called reflection hologram recording medium including a reflection film. The recording and reproducing apparatus 1 is adapted to such a reflection hologram recording medium 5.

In FIG. 1, in the recording and reproducing apparatus 1, an optical system including a laser diode LD, a collimator lens 2, an SLM (Spatial Light Modulator) 3, a beam splitter 4, an object lens OL, and an image sensor 6 shown in the figure is provided.

The laser diode LD is provided as a light source for obtaining a laser beam for recording and reproduction. Light emitted from the laser diode LD is transmitted through the collimator lens 2, converted into parallel light, and guided to the SLM 3. As the SLM3, for example, a transmission liquid crystal panel is used.

The light subjected to spatial light modulation by the SLM 3 is transmitted through the beam splitter 4 and guided to the object lens OL. The light is transmitted through the object lens OL and irradiated on the hologram recording medium 5 set in a predetermined position.

During recording, spatial light modulation corresponding to recording data is performed by the SLM 3 as described later. The parallel light subjected to modulation in this way is transmitted through the object lens OL to be changed to convergent light and condensed on the hologram recording medium 5.

During reproduction, on a path same as that described above, light from the laser diode LD is subjected to modulation for reproduction by the SLM 3 and, then, irradiated on the hologram recording medium 5, whereby diffractive light corresponding to recording data is obtained as described later. This diffractive light is converted into parallel light through the object lens OL as reflected light from the hologram recording medium 5, then, reflected on the beam splitter 4, and guided to the image sensor 6. The image sensor 6 is, for example, a CCD (Charge Coupled Device) sensor or CMOS (Complementary Metal Oxide Semiconductor) sensor. The image sensor 6 receives the reflected light (the diffractive light) from the hologram recording medium 5 guided as described above and converts the reflected light into an electric signal. Consequently, a readout signal is obtained.

A method of recording data on and reproducing data from the hologram recording medium 5 by the optical system explained above is explained with reference to FIG. 2 and FIGS. 3A and 3B. FIG. 2 shows a recording method and FIGS. 3A and 3B show a reproducing method.

In FIG. 2, only the SLM 3 and the object lens OL in the optical system shown in FIG. 1 are shown. In FIG. 3A, only the SLM 3 and the object lens OL are shown. In FIG. 3B, only the object lens OL and the image sensor 6 are shown.

During recording shown in FIG. 2, the SLM 3 applies intensity modulation to incident light from the collimator lens 2 to arrange, on a concentric circle, the reference light and light in which a data array of "0" and "1" is formed on the basis of recording data (hereinafter referred to as signal light).

The light subjected to the intensity modulation (i.e., the reference light and the signal light) is condensed on the hologram recording medium 5 by the object lens OL. Interference fringes of the reference light and the signal light formed by the condensing of the light is recorded on the hologram recording medium 5 as data.

During reproduction, as shown in FIG. 3A, incident light from the collimator lens 2 is subjected to intensity modulation by the SLM 3 to output only a reference light pattern and condensed on the hologram recording medium 5. The condensed light is diffracted by interference fringes corresponding to a data pattern recorded on the hologram recording medium 5 and outputted from the hologram recording medium 5 as reflected light. This diffractive light has an intensity modulation pattern reflecting recording data as shown in the figure. Data reproduction is performed on the basis of a result of reading out the intensity modulation pattern of the diffractive light with the image sensor 6.

As described above, the SLM 3 generates reference light and signal light during recording and generates reference light during reproduction. Therefore, in the SLM 3, a reference light area A1, a signal light area A2, and a gap area A3 shown in FIG. 4 are defined. A predetermined circular area including the center portion of the SLM 3 is set as the signal light area A2 as shown in the figure. In the outer peripheral portion of the signal light area A2, an annular reference light area A1 on a circle concentric with the signal light area A2 is set across the gap area A3.

The gap area A3 is set as an area for preventing the reference light during readout from leaking in the signal light area A2 to be noise.

During recording, after pixels decided in advance in the reference light area A1 is set as "1" (light intensity is high), other pixels in the reference light area A1 is set as "0" (light intensity is low), and the entire gap area A3 and the entire outer peripheral portion further on the outside than the reference light area A1 is set as "0", respective pixels in the signal light area A2 are formed in a necessary pattern of "0" and "1" corresponding recording data. Consequently, it is possible to generate and output the reference light and the signal light shown in FIG. 2.

During reproduction, only the reference light area A1 is formed in a pattern of "0" and "1" same as that during recording and the entire other area is formed as an area of bit "0". Consequently, it is possible to generate and output only the reference light as shown in FIG. 3A.

The recording and reproducing apparatus 1 shown in FIG. 1 includes a data modulating unit 7 for realizing a modulation pattern in the SLM 3 described above in addition to the optical system explained above.

The data modulating unit 7 is inputted with recording data supplied during recording and generates a data pattern in the signal light area A2 to lay this recording data in the signal light area A2 according to a predetermined format.

Moreover, the data modulating unit 7 generates a data pattern with the reference light area A1 formed as a predetermined pattern of "0" and "1" decided in advance and the entire gap area A3 and the entire outer peripheral portion further on the outside than the reference light area A1 formed as an area of bit "0". The data modulating unit 7 combines this data pattern and the data pattern in the signal light area A2 to generate a data pattern for all effective pixels of the SLM 3.

It is possible to obtain modulated light (signal light and reference light) during recording shown in FIG. 2 by controlling to drive the respective pixels of the SLM 3 on the basis of this data pattern.

On the other hand, during reproduction, the data modulating unit 7 generates a data pattern with only the reference light area A1 formed in a pattern of "0" and "1" same as that during recording and the entire other area formed as an area of bit "0". It is possible to obtain modulated light during reproduction shown in FIG. 3A by controlling to drive the respective pixels of the SLM 3 on the basis of this data pattern.

A data format of recording data adopted in this embodiment and the internal structure of the data modulating unit 7 for realizing the data format are described later.

The recording and reproducing apparatus 1 includes a data reproducing unit 8 for reproducing recording data on the basis of readout values of respective pixels in the image sensor 6.

As described later, syncs are inserted in recording data at predetermined intervals. The data reproducing unit 8 specifies positions of the syncs (sync detection). The data reproducing unit 8 calculates amplitude values of respective pixels based on the specified sync positions and data identification to reproduce data.

Operations corresponding to a reproducing method according to this embodiment performed by the data reproducing unit 8 and the internal structure for the operations are described later.

2. Hologram Recording and Reproducing Method in the Past

Before explaining a hologram recording and reproducing method according to this embodiment, first, a specific example of a hologram recording and reproducing method in the past is explained.

Terms used in the following explanation are defined as follows:

Symbol: Minimum unit of record encoding; as a specific example, 1 byte (8 bits) of recording data converted into a square data unit of 4 bits×4 bits Sub-page: Data unit of 6 symbols×6 symbols (24 bits×24 bits)

Page: Unit of a total data amount finally laid in the signal light area A2

First, a recording format in the past is explained with reference to FIG. 23 and FIGS. 24A and 24B.

FIG. 23 schematically shows a modulation pattern in the SLM. FIGS. 24A and 24B show examples of patterns of syncs inserted in recording data.

In FIG. 23, in the technique in the past, in forming data as one page, data is laid in the circular signal light area A2 with one sub-page as a minimum unit as shown in the figure.

In laying the data, syncs are inserted in the data at predetermined intervals. In the technique in the past, a page sync shown in the figure is inserted at the top of each page (in this case, in a position at the left end at the uppermost stage).

Figure 24A:
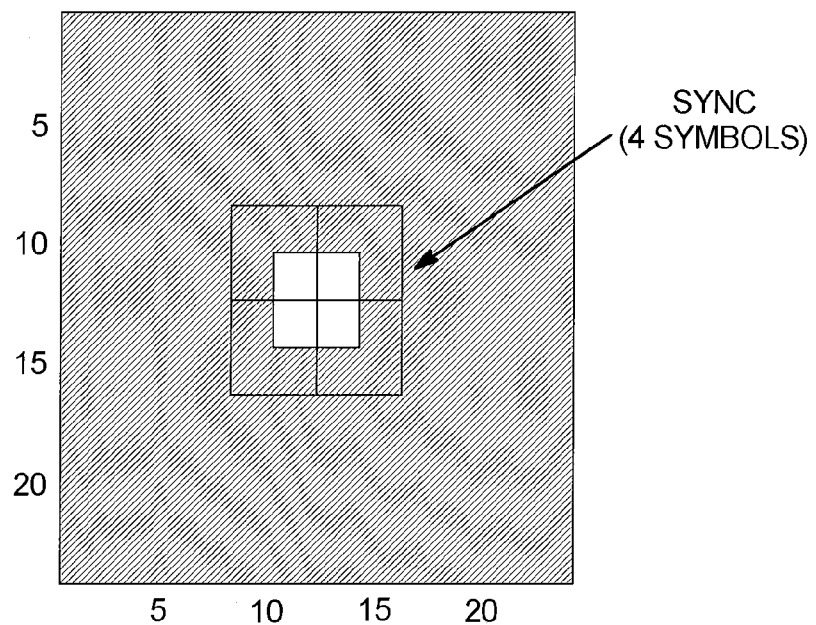
FIGS. 24A and 24B are diagrams for explaining a specific example of a recording data format adopted in the recording and reproducing method in the past and showing an example of a pattern of a sync inserted in recording data.

For the page sync, as shown in FIG. 24A, an area for one sub-page is allocated. As a data pattern of the sub-page, as shown in the figure, a pattern in which all bits of 4 bits×4 bits (bits for 1 symbol) in the center of 4 (2×2) symbols located in the center of one sub-page are set as "1" and all bits other than the bits are set as "0" is defined. In this case, data patterns for the 4 symbols in the center are as follows:

"00000000
00000000
00111100
00111100
00111100
00111100
0000000
00000000".

All bits other than 4 symbols in the center are "0".

Figure 24B:
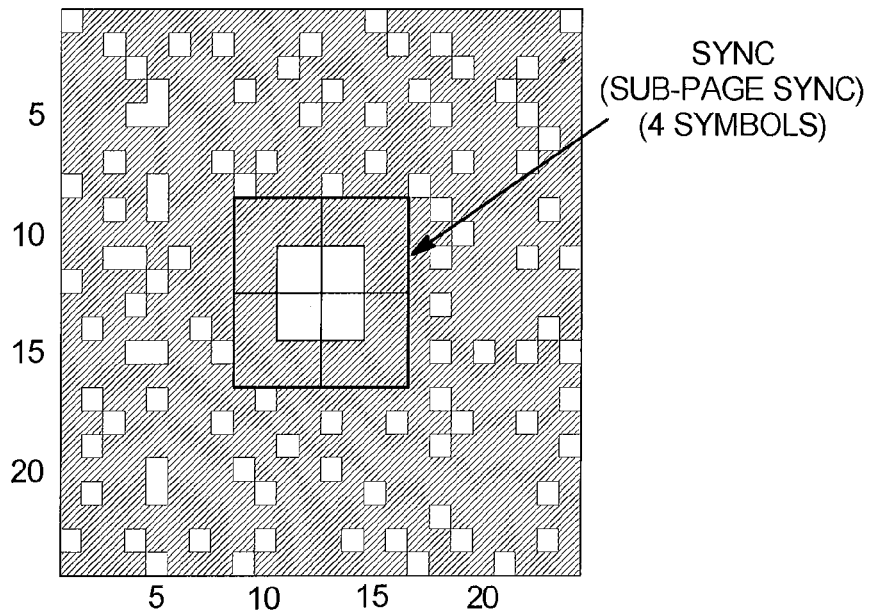

Moreover, in one page, a sub-page sync shown in FIG. 24B is given to each sub-page set as a minimum unit of data laying as described above.

As this sub-page sync, a pattern same as the 4 symbols in the center of the page sync described above is inserted in positions for the 4 symbols in the center in one sub-page.

In this way, in the format in the past, the data is laid in the signal light area with one sub-page as a minimum laying unit. Concerning the syncs, the page sync (for one sub-page) is inserted for each page and the sub-page sync (for 4 symbols) is inserted for each sub-page in one page.

With such a format, in the technique in the past, it is possible to pack user data (data other than the syncs) for 3552 symbols as the number of effective symbols in a signal light area with a radius of 154 pixels (pixel is one pixel of the SLM) as shown in FIG. 23. In other words, an effective capacity for one page is 3552 symbols.

Figure 5:
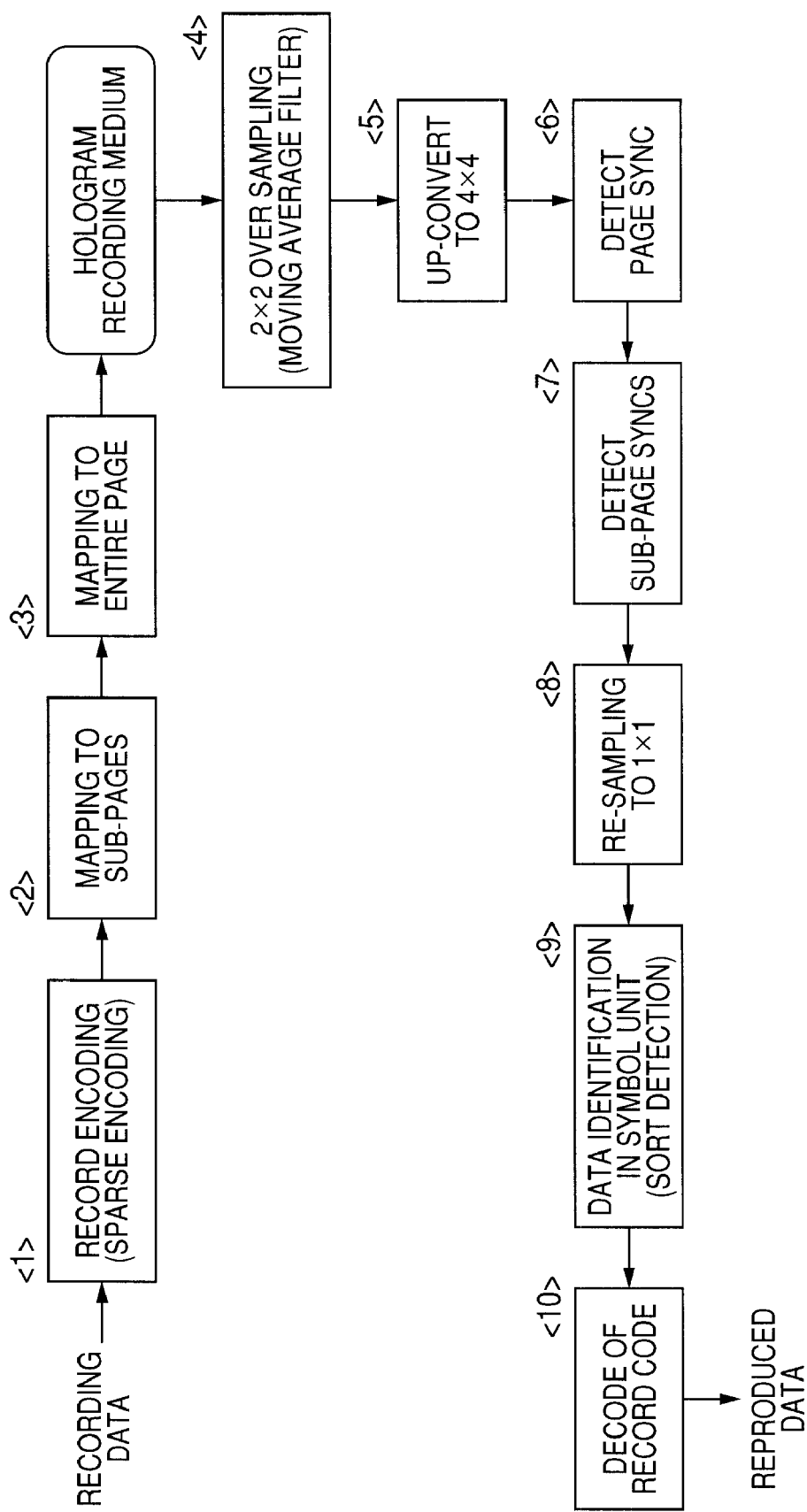
FIG. 5 is a diagram schematically showing an example of a hologram recording and reproducing method in the past based on a recording format in the past.

FIG. 5 schematically shows an example of a hologram recording and reproducing method in the past performed on the basis of such a recording data format in the past. In FIG. 5, a processing procedure of recording and reproduction by the method in the past is shown in a form of blocks.

First, during recording, as indicated by <1>, record modulation encoding for recording data is performed. In this case, as a record modulation code, for example, a so-called sparse code is used. Specifically, with this sparse code, one byte (8 bits) of recording data is converted into a square data array of 4 bits×4 bits (i.e., 1 symbol) and only 3 bits of 16 bits after the conversion is "1" and the remaining 13 bits are "0".

After performing processing for dividing the recording data by symbol units according to the record encoding such as the spare encoding, mapping to sub-pages is performed as indicated by <2>. Respective symbols obtained by the encoding are mapped into the sub-pages.

As shown in FIG. 23, in each of the sub-pages, a sub-page sync is inserted in 4 symbols in the center of the sub-page. Therefore, in the mapping processing in <2>, the generated symbols for one page (in this case, 3552 symbols) are grouped into sets of 12 symbols. The respective sets of 12 symbols are arranged in order and each of the sub-pages is mapped to arrange sub-page syncs of the predetermined pattern shown in FIG. 24B in the four symbols in the center of the sub-page. In this way, 111 sub-pages in total are generated.

When the sub-pages are generated, as indicated by <3>, mapping to an entire page is performed. In other words, one page sync shown in FIG. 24A and the generated 111 sub-pages are mapped into (laid in) the signal light area A2 according to a format.

In this case, the SLM generates reference light as well. Thus, as a data pattern for all effective pixels of the SLM, a data pattern obtained by combining the pattern (only pixels decided in advance are set as "1") of the reference light area A1 and the pattern (all pixels are set as "0") of the gap area A3 and the outer periphery further on the outside than the reference light area A2 explained above is generated together with the data pattern for one page generated in this way.

The SLM is controlled to be driven on the basis of this data pattern, whereby recording of data on the hologram recording medium by interference fringes of signal light and reference light is performed.

The mapping of the symbol to the sub-pages in <2> and the mapping of the sub-pages to the entire page in <3> may be performed in any order. However, in general, mapping starting from the left end at the uppermost stage, moving to the right end, moving down one stage, and returning to the left end is repeated to the right end at the lowermost stage.

Reproduction of the data recorded on the hologram recording medium in this way is performed as described below.

First, as indicated by <4>, 2×2 over-sampling is performed. The number of pixels of the image sensor is set to be four times (2×2) as large as the number of pixels of the SLM in advance to receive light for one pixel of the SLM with four (2×2) pixels on the image sensor.

As described above, the light for one pixel of the SLM is over-sampled using plural pixels on the image sensor in this way as measures against difficulty in strictly set the respective pixels on the image sensor and the respective pixels of the SLM in a one to one relation because of optical distortion, a magnification, and the like.

In the 2×2 over-sampling in <4>, in order to improve a frequency characteristic of a readout signal obtained by the over-sampling, some filter such as a moving average filter is applied to the readout signal.

In <5>, up-convert to a pixel size of 4×4 is further applied to the readout signal subjected to the 2×2 over-sampling as described above.

In other words, 2×2 up-convert is further applied to the readout signal by interpolating respective values obtained by the 2×2 over-sampling (and the filter processing) (up-convert to a pixel size of 4×4). Since this up-convert to a pixel size of 4×4 is performed, it is possible to set a resolution of the image sensor sixteen times as high as that of one pixel of the SLM.

After the readout signal has undergone the over-sampling and the up-convert, processing for properly performing calculation of amplitude values of the respective pixels taking into account the optical distortion and the like is performed.

First, as indicated by <6>, the detection of a page sync is performed. A position of a page sync that should be inserted in the readout signal obtained by the over-sampling and the up-convert is detected on the basis of a data pattern of the page sync defined in a format in advance.

In each of the pixels of the image sensor, an amplitude value of the pixel is obtained in, for example, 256 gradations of 0 to 255. In other words, each value obtained through the over-sampling and the up-convert is a value represented by 0 to 255.

A method adopted as a specific method of detecting a page sync is a method of generating a sync reference pattern obtained by replacing a data pattern (a pattern of 0 and 1) of a page sync known in advance with such a value of 256 gradations, applying correlation calculation with the sync reference pattern to positions around a position where a page sync should be present (this can be estimated from the format) in the signal obtained by the over-sampling and the up-convert, and specifying a position where a correlation value is the largest as a result of the correlation calculation as a synch position (such a data identifying system is called a correlation detection system).

Since the position of the page sync is specified in this way, it is possible to perform rough alignment of the entire page.

Then, as indicated by <7>, the detection of sub-page syncs is performed. Positions of respective sub-page syncs in the page are specified.

If one reference point in the page as the page sync is decided as described above, it is possible to specify, on the basis of a recording format, how many pixels positions where object sub-page syncs should be present are apart from the decided reference point. Thus, with the detected position of the page sync as a reference, as in the example described above, positions of the sub-page syncs are specified by the correlation detection system around positions where object sub-pages estimated according to the format should be present.

When the respective sub-page syncs are detected, as indicated by <8>, processing for re-sampling the sub-page syncs to 1×1 is performed. Positions of readout signals corresponding to the respective recording pixels of the SLM (simply referred to as positions of the pixels as well) are specified from the signal subjected to the over-sampling and the up-convert on the basis of the detected positions of the respective sub-page syncs and values of the positions are acquired.

Specifically, positions of the respective pixels are specified for each of the sub-pages on the basis of the detected positions of the respective sub-pages and amplitude values of the respective pixels are acquired. In this case, in order to perform data identification in symbol units corresponding to the sparse encoding system explained below, the acquired values of the respective pixels are grouped in symbol units.

In <9>, the data identification in symbol units is performed. The data identification is performed to detect bit values of the respective pixels from the values grouped in symbol units as described above.

In the case of the sparse code in which 3 bits in 1 symbol (16 bits) are "1" adopted in this case, it is possible to apply a data identification system called "sort detection" for setting three pixels having large values to bit "1". Thus, data identification by such sort detection is applied to the respective symbols to detect values of final recording bits.

Finally, as indicated by <10>, decode processing for the recording code (the sparse code) is performed.

The respective bit values obtained for each of the symbols by the data identification in symbol units are rearranged according to the order of the mapping during recording and the rearranged bit values are decoded (demodulation of the sparse code) to reset 1 symbol (16 bits) to 1 byte (8 bits) and obtain reproduced data having content same as that of the recording data.

3. Recording Method According to the Embodiment
3-1. Recording Format

As described above, the recording and reproducing technique for the hologram recording medium is still at the stage of development under the present situation and there is room of improvement in the recording and reproducing system in the past. Thus, in this embodiment, a new recording data format explained below is proposed. In the following explanation, the recording data format may be abbreviated as recording format or simply as format.

Figure 6:
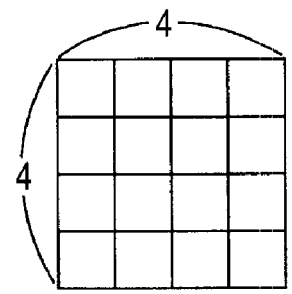
FIG. 6 is a diagram for explaining a recording format according to the embodiment and showing an example of a minimum laying unit for laying data in a signal light area.
Figure 7A:
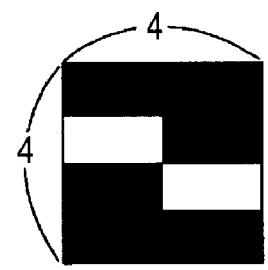
FIGS. 7A and 7B are diagrams for explaining the recording format according to the embodiment and showing an example of a sync pattern and intervals for inserting syncs.
Figure 7B:
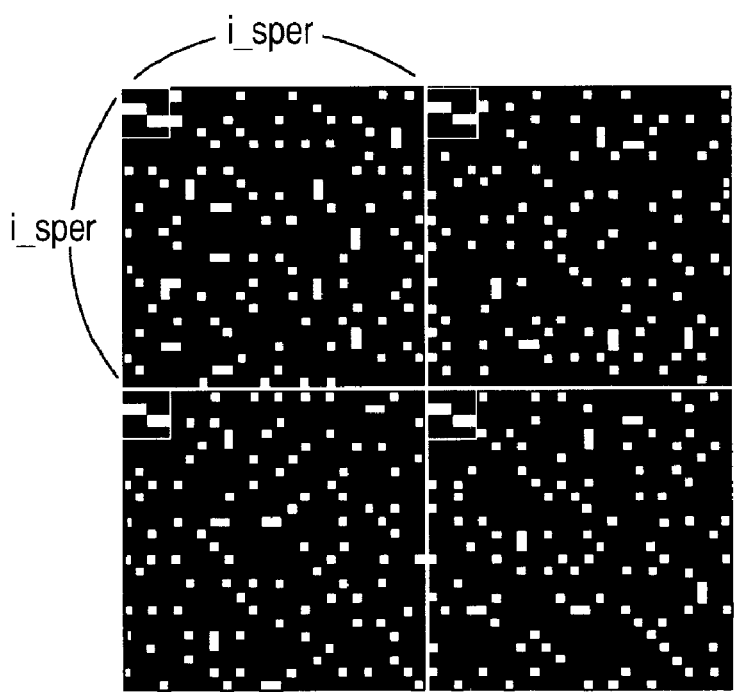
Figure 8:
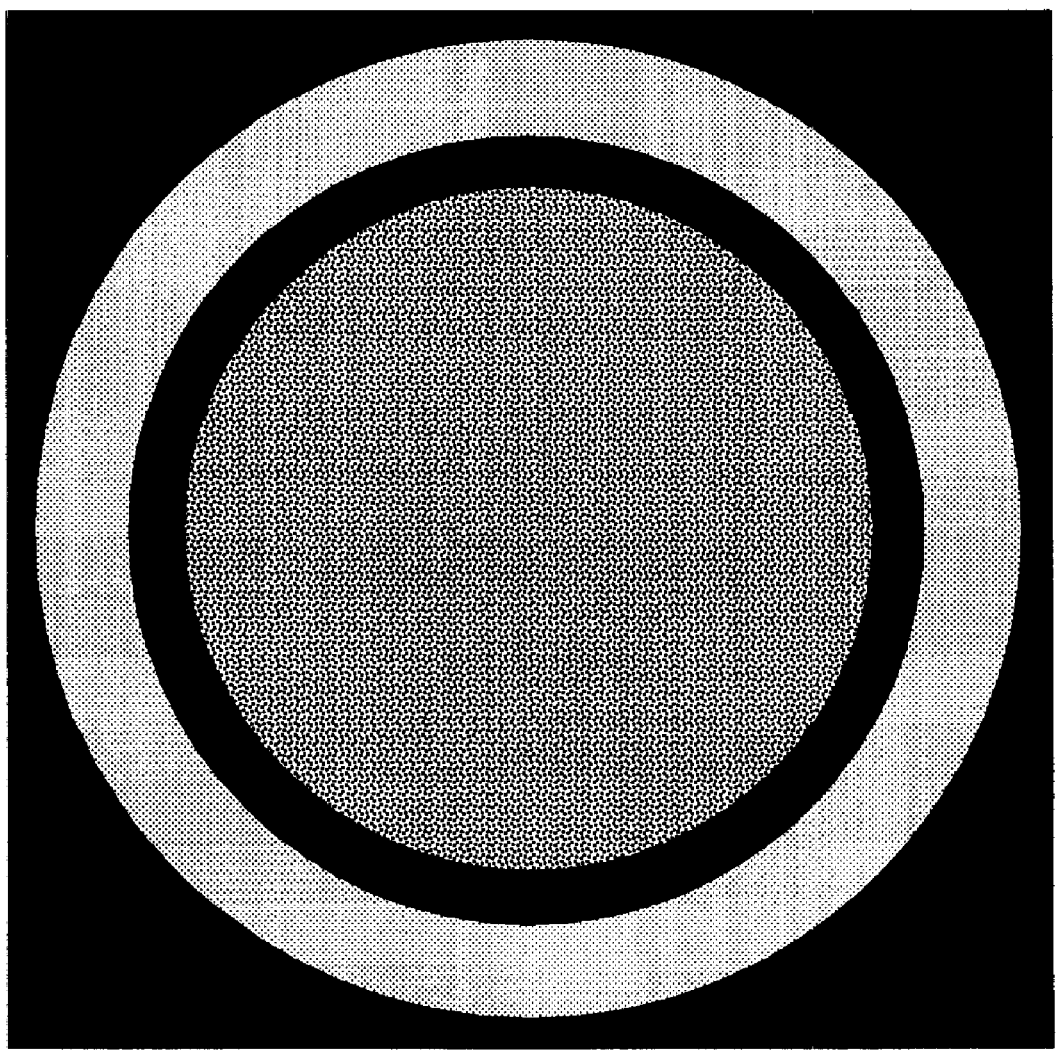
FIG. 8 is a diagram for explaining a data array in the signal light area based on the recording format according to an embodiment and schematically showing an image pattern in the spatial light modulator during recording.

FIGS. 6 to 8 are diagrams for explaining the recording data format according to this embodiment.

As a first improvement, a minimum unit of data laying in the signal light area A2 is set smaller than that in the past to increase a data volume that can be laid in the circular signal light area A2.

Specifically, in this embodiment, one symbol (i.e., a minimum unit of record encoding: in this case, 4 bits×4 bits) shown in FIG. 6 is set as a minimum laying unit. In other words, the minimum laying unit is set smaller than one sub-page (6 symbols×6 symbols=24 bits×24 bits) that is the minimum laying unit in the past shown in FIG. 23.

As a second improvement, a ratio of syncs is reduced to increase a data volume.

The page sync used for performing rough alignment of the entire page in the past is abolished.

Moreover, a size of a sync itself is also reduced as shown in FIG. 7A. In other words, a sync size is reduced to 1 symbol as shown in the figure as opposed to 2 symbols×2 symbols of the sub-page sync in the past.

A data pattern of a sync may be any pattern as long as the data pattern is a combination of data that is not generated in general recording data. In FIG. 7A, a specific example of the data pattern is shown. In this example, for example, a data pattern [0000, 1100, 0011, 0000] is set from the upper left end to the lower right end of a sync in order.

Moreover, in this embodiment, such a method of inserting syncs is also improved.

As shown in FIG. 7B, two dimensional arrangement intervals (intervals in vertical and horizontal directions) of the respective syncs are inserted as predetermined intervals i_sper. In FIG. 7B, the periphery of four syncs combined with recording data is shown in enlargement. As shown in FIG. 7B, in the case of this embodiment, the respective syncs are inserted with the sync intervals i_sper set to 24 pixels (bits). With the setting of such sync intervals, the syncs in this case are inserted at a ratio of one for one sub-page (6 symbols×6 symbols) as in the past. However, as a size of the syncs is set to 1 symbol as described above, a ratio of syncs is reduced compared with a ratio of 4 symbols/1 sub-page in the past.

In this embodiment, since a sync in the center of a page is detected during reproduction described later to perform rough alignment, inserting positions of the respective syncs are decided such that 1 symbol in the center of the page is typically in a sync position (e.g., see distributions of syncs shown in FIGS. 9 and 10).

Specifically, after the 1 symbol located in the center of the page is decided as the sync position, inserting positions of the respective syncs are decided to be arranged apart from one another at the intervals of i_sper with the synch position in the center as a reference.

As advantages of typically setting the center position of the page as the sync position, it is possible to perform rough alignment as described above and, besides, it is possible to arrange the respective syncs in the page without bias.

For example, in determining inserting positions of syncs, it is conceivable to simply start a sync at the top of the page (in this case, for example, the left end at the uppermost stage) and insert each of the syncs at each of the intervals i_sper with a position of the sync as a reference. When the syncs are inserted in this way, an arrangement of the syncs in the entire page is biased and an area not surrounded by the syncs in the outer peripheral portion of the signal light area A2 is biased. As a result, the accuracy of calculation of amplitude values of respective pixels is likely to be biased.

If the center of the page is decided as the sync position as described above, it is possible to prevent such a problem.

FIG. 8 is a diagram for explaining a data array in the signal light area A2 based on the recording format explained above. In this figure, an image pattern in the SLM 3 during recording is schematically shown.

As it is seen when FIG. 8 and FIG. 23 are compared, data can be laid with smaller gaps in the signal light area A2 in the format according to this embodiment than in the format in the past. In other words, it is possible to increase a data volume because the data can be laid with smaller gaps.

In the case of the technique in the past shown in FIG. 23, the patterns of the page sync and the sub-page syncs can be clearly checked. However, in this embodiment, the patterns of the respective syncs are too small to be checked. Therefore, it is also understood that a data volume is increased.

Figure 9:
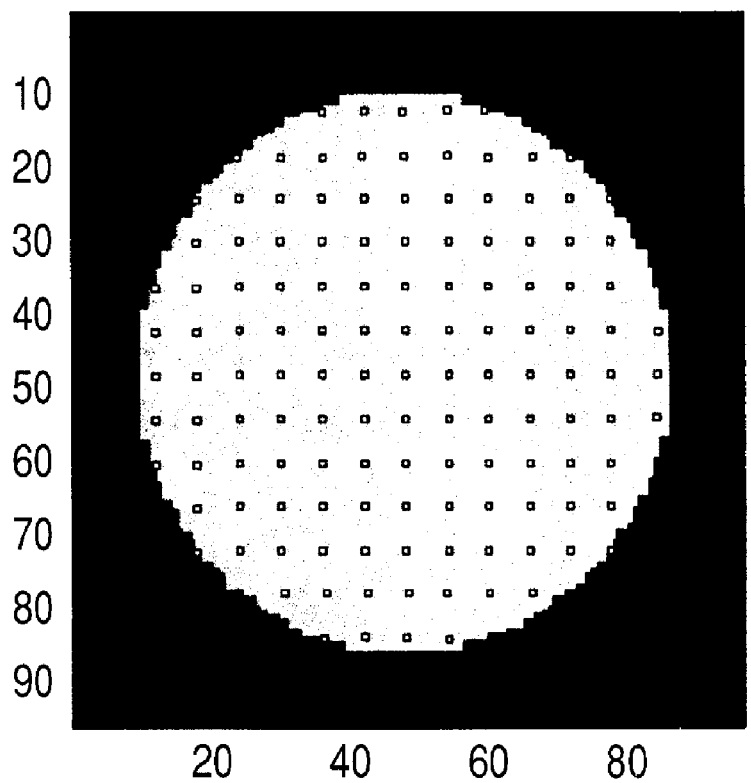
FIG. 9 is a diagram showing a result of actually performing an experiment concerning the recording format according to an embodiment.
Figure 10:
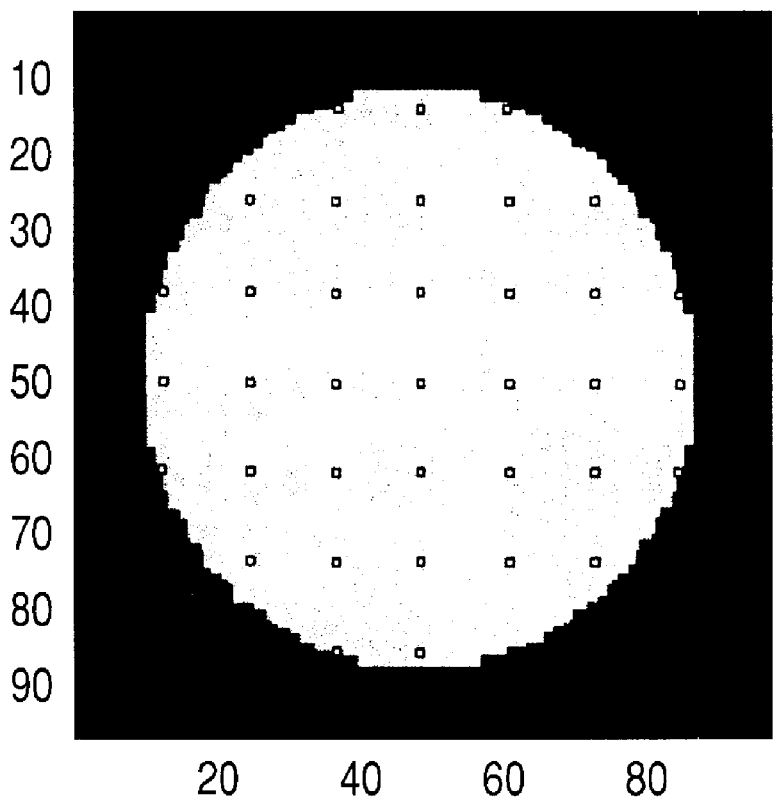
FIG. 10 is a diagram showing a result of actually performing an experiment concerning the recording format according to an embodiment.

In FIGS. 9 and 10, results of actually performing experiments concerning the recording format according to this embodiment (results of experiments performed by changing various parameters) are shown.

FIG. 9 shows, as the specific example cited above itself, a state of a data array in the signal light area A2 at the time when the minimum laying unit is set to 1 symbol, the sync size is set to 1 symbol, and the sync intervals i_sper are set to 24 and shows a data volume at that time.

FIG. 10 shows, as an example in which the sync intervals i_sper are expanded, a data array in the signal light area A2 at the time when the minimum laying unit is set to 1 symbol, the sync size is set to 1 symbol, and the sync intervals i_sper are set to 48 and shows a data volume at that time.

In FIGS. 9 and 10, a distribution of the syncs is indicated by square voids in the figure.

In obtaining the results of the experiments shown in the figures, a radius i_rad of the signal light area A2 is set to 154 pixels as in the case shown in FIG. 23.

When the minimum laying unit is set to 1 symbol, the sync size is set to 1 symbol, and the sync intervals i_sper are set to 24 as shown in FIG. 9, an effective data volume that can be laid in one page (i.e., a data volume excluding a sync portion) is 4513 symbols (when the sparse encoding is adopted, 4513 bytes). In other words, a data volume is increased by about 1.27 times compared with that in the past shown in FIG. 23.

When the minimum laying unit is set to 1 symbol, the sync size is set to 1 symbol, and the sync intervals i_sper are set to 48 as shown in FIG. 10, an effective data volume that can be laid in one page is 4609 symbols (bytes). A data volume is increased by 1.30 times compared with that in the past.

A specific procedure for deciding the recording format according to this embodiment described above is explained.

In deciding the format in this case, the radius i_rad of the signal light area A2 and the sync intervals i_sper are parameters. The format is decided as described below on the basis of the two parameters i_rad and i_sper.

(a) The radius i_rad of the signal light area A2 is determined and an area in which data is laid is secured in symbol units in the SLM 3 according to a value of the radius i_rad. Consequently, an area for one page on the SLM 3 is determined.

(b) The sync intervals i_sper are decided and a position where syncs are inserted in the signal light area A2 are secured. In this case, in this embodiment, 1 symbol in the center of the page is a sync position as described above and the respective syncs are arrayed at each of the intervals i_sper with the sync position in the center as a reference. Therefore, specifically, first, a center symbol in an area for one page decided in the procedure in (a) is specified and inserting positions of the respective syncs are determined such that the syncs are arranged at the intervals i_sper.

According to the procedure described above, inserting positions of the respective symbols and the respective syncs on the SLM 3 are decided. However, actually, during reproduction, the symbols are rearranged according to an insertion order during recording to obtain reproduced data. Thus, as a recording format, a number is decided for each of the positions of the respective symbols on the SLM 3 in advance such that such rearrangement is possible.

Specifically, numbers are given in order from the upper left at the uppermost stage for each of the inserting positions of the respective symbols determined by the procedure in (b). Consequently, it is possible to manage the respective symbols in one page during recording and reproduction with numbers.

During recording, mapping of the recording data and insertion of the respective syncs are performed according to the inserting positions of the respective symbols and the inserting positions of the respective syncs on the SLM 3 specified by the format set in this way.

3-2. Recording Procedure

A recording procedure according to this embodiment that should be performed on the basis of the recording format according to this embodiment explained above is explained.

A procedure for recording in this case can be roughly divided as follows:
1) Sparse encoding
2) Mapping to an entire page
3) Irradiation of signal light and reference light First, as the sparse encoding in 1), encoding same as that in the past described above is applied to recording data.

Specifically, first, recording data of the number of bytes corresponding to a recording format (e.g., in the case of FIG. 9, 4513 bytes) are prepared and the recording data are subjected to the sparse encoding and converted into a symbol of 16 bits (4 bits×4 bits) in order. In this case, numbers are given to the respective symbols, for example, in an order of conversion such that an array in an order of data numbers conforming to the format is possible.

According to the mapping to an entire page in 2), these symbols and the syncs of the predetermined pattern shown in FIG. 7A are arrayed in the page according to the recording format. Specifically, the symbols are arranged in inserting positions conforming to the given numbers and the syncs are arranged in inserting positions thereof. Consequently, since an array pattern of the data in the signal light area A2 is decided, after that, a data pattern of the entire SLM 3 is decided together with patterns of the gap area A3, the reference light area A1, and an area in the outer periphery thereof.

Then, data recording on the hologram recording medium 5 is actually performed by the irradiation of signal light and reference light in 3). In a state in which the respective pixels of the SLM 3 are controlled to be driven according to the pattern of the data array of the entire SLM 3 decided as described above, laser beam irradiation by the laser diode LD is performed to irradiate the reference light and the signal light on the hologram recording medium 5 and record the data with interference fringes of the reference light and the signal light.

3-3. Structure of a Signal Processing Unit

In order to realize these recording procedures, the recording and reproducing apparatus 1 shown in FIG. 1 includes the data modulating unit 7 for applying modulation corresponding to a format to recording data and performing drive control for the SLM 3.

Figure 11:
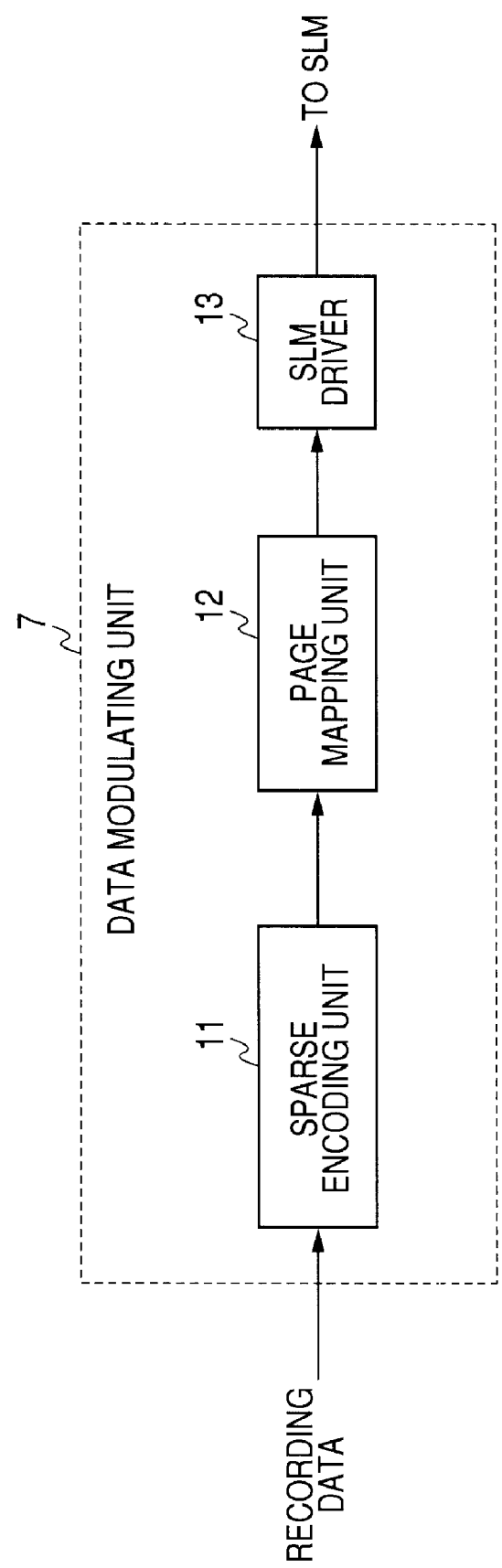
FIG. 11 is a block diagram showing a structure of a signal processing unit for performing a recording operation based on the recording format according to an embodiment.

The internal structure of the data modulating unit 7 is shown in FIG. 11.

In FIG. 11, the data modulating unit 7 includes a sparse encoding unit 11, a page mapping unit 12, and an SLM driver 13.

First, the sparse encoding unit 11 performs an operation corresponding to the procedure in 1).

Recording data is supplied to the sparse encoding unit 11 from the outside as shown in the figure when the recording data is recorded on the hologram recording medium 5. The recording data is divided for each number of bytes for one page corresponding to recording format (i.e., divided in page units) and the recording data for each page is sequentially subjected to sparse encoding and converted into symbols of 16 bits (4 bits×4 bits). Data numbers are given to the respective symbols for each page. An order of giving the data numbers to the respective symbols in each page conforms to, for example, an input order of data.

The page mapping unit 12 performs mapping of a group of symbols obtained for each page (in this case, 4513/page) by the sparse encoding unit 11 into the page.

In the mapping for each page, as explained above, the respective symbols are arranged in inserting positions decided in the recording format according to the data numbers given to the symbols. At the same time, syncs are arranged in inserting positions conforming to the recording format, respectively. An array pattern of the data in the signal light area A2 decided in this way and patterns of the gap area A3, the reference light area A1, and a pattern in the outer periphery thereof are combined to decide a data pattern of the entire SLM 3.

Since such mapping for each page is sequentially performed, a data array pattern for each page is sequentially supplied to the SLM driver 13. The SLM driver 13 controls to drive the respective pixels of the SLM 3 shown in FIG. 1 according to the data array pattern supplied in this way.

As explained with reference to FIG. 2, during recording, laser beam irradiation from the laser diode LD is performed. In this state, since the SLM 3 is sequentially controlled to be driven as described above, it is possible to sequentially record a data pattern for each page on the hologram recording medium 5.

In this way, it is possible to record a pattern corresponding to recording data on the hologram recording medium 5 in page units.

As explained above, in the recording method (the recording format) according to this embodiment, since the minimum laying unit of data in the signal light area A2 is set smaller than that in the past, it is possible to lay a larger number of data in the circular signal light area A2. Consequently, it is possible to increase a recording volume of data on the hologram recording medium 5.

Specifically, whereas the minimum laying unit in the past is one sub-page (6 symbols×6 symbols=24 bits×24 bits), in this embodiment, the minimum laying unit is 1 symbol (4 bits×4 bits). In other words, since a minimum unit that can be handled is 1 symbol because of the sparse encoding, the minimum unit is set as a minimum unit for laying.

In addition, in this embodiment, the sync size is 1 symbol and syncs are arranged in the recording data at each of the predetermined intervals i_sper.

For example, when 24 pixels are set as the intervals i_sper, compared with 4 symbols per one sub-page in the past, a capacity for syncs per one sub-page can be set to 1 symbol and an insertion ratio of syncs can be reduced to ¼.

In the past, the page sync is inserted for one page. However, since the page sync is abolished, a data volume is increased.

In the technique in the past in which the minimum laying unit is the sub-page unit, since the minimum laying unit is large, a minimum unit that can be increased or decreased for the radius i_rad of the signal light area A2 is also large. Therefore, it is difficult to secure a degree of freedom of a value that can be set as the radius i_rad of the signal light area A2 when a recording format is decided. However, according to this embodiment in which a symbol smaller than the sub-page is set as a minimum laying unit, it is possible to make it easier to adjust the number of data laid in the radius direction. As a result, it is possible to remarkably increase a degree of freedom in setting the radius i_rad when a recording format is decided.

When an actual format is decided, the radius i_rad is an important parameter not only in increasing a recording volume but also in realizing a reduction in an error rate and the like. Therefore, it is possible to increase a degree of freedom in setting the radius i_rad as described above, it is possible to more easily perform optimization of a recording format.

4. Reproducing Method According to the Embodiment 4-1. Overview of the Reproducing Method It is possible to increase a recording volume compared with that in the past by adopting the recording method (the recording format) according to this embodiment as described above. When a method of relatively reducing a ratio of syncs in a page such as a reduction in a sync size and an increase in the sync intervals i_sper is adopted as a method of increasing the recording capacity, it is likely that the accuracy of calculation of amplitude values of respective pixels performed on the basis of respective sync positions in the page falls.

Therefore, in this embodiment, a reproducing method that can properly perform amplitude value calculation even when a ratio of syncs is relatively small in this way is also proposed.

An overview of the reproducing method according to this embodiment is explained with reference to the reproducing method (the reproducing procedure) in the past shown in FIG. 5.

According to this embodiment, as in the past, the over-sampling and the up-convert explained as <4> and <5> in FIG. 5 are performed to increase a resolution for one pixel of the SLM 3. In this case, as in the past, the over-sampling is also set such that, for example, reproduced light for one pixel of the SLM 3 is received by four pixels (2×2) in the image sensor 6 to secure a resolution of the image sensor 6 four times as high as that of one pixel of the SLM 3.

As the up-convert, up-convert to a pixel size of 4×4 is performed by, for example, interpolating signals obtained by the 2×2 over-sampling. Consequently, in this embodiment, as in the past, a resolution of the image sensor 6 sixteen times as high as that of one pixel of the SLM 3 is obtained. That is, sixteen values are obtained per one pixel of the SLM 3.

After the over-sampling and the up-convert are performed in this way, in this embodiment, as in the past, the detection of sync positions is performed. However, as it is understood from the above explanation, since there is no concept of a page sync and a sub-page sync in the recording format according to this embodiment, the detection of a page sync and a sub-page sync indicated by <6> and <7> in FIG. 5 is not performed and new sync detection is performed.

The reproducing method according to this embodiment has a characteristic in this sync detection.

Specifically, the detection of respective sync positions is performed using plural syncs according to a reduction in a ratio of syncs.

In this embodiment, the detection of a sync position in the center of a page is performed instead of the rough alignment of the entire page by the page sync in the past. Such detection of a center sync position is also performed using plural syncs.

A specific example of such a sync detecting method according to this embodiment is described later.

After the respective sync positions are specified by such sync detection, re-sampling to a pixel size of 1×1 is performed on the basis of the sync positions (<8> in FIG. 5). In other words, with the specified sync positions as a reference, positions of pixels corresponding to the respective pixels of the SLM 3 are specified and amplitude values of the pixel positions are calculated.

However, in the case of this embodiment, since the minimum laying unit is 1 symbol, it is difficult to perform handling of data in sub-page units in the re-sampling in <8> in the past.

Specifically, in the technique in the past, the minimum laying unit is set to one sub-page and any area in a page can be divided for each sub-page. Thus, for each of the sub-pages, positions of respective pixels in the sub-page can be specified and amplitude values of the pixels can be calculated using syncs inserted at a ratio of one for the sub-pages. However, when the minimum laying unit is set to 1 symbol and a sync is inserted at each of the intervals i_sper, it is difficult to make a ratio of data to one sync equal in, in particular, the outer peripheral portion of the signal light area A2. Therefore, it is difficult to adopt a re-sampling method completely the same as that in the past.

Therefore, in this embodiment, re-sampling is also performed using plural syncs. This re-sampling is explained later.

After the 1×1 re-sampling is performed in this way, in this embodiment, as in the past, reproduced data can be obtained by, after performing data identification (detection of respective bit values) in symbol units of <9>, performing decode of a sparse code (<10>) for the respective bit values for each of such symbols and decoding the sparse code of 1 symbol (16 bits) to 1 byte (8 bits).

4-2. Specific Example of the Reproducing Method

A specific example of the reproducing method according to this embodiment is explained with reference to FIGS. 12 to 18. First, a data array in a page realized by the recording format according to this embodiment is reconsidered.

In this figure, as an example of a data array in the signal light area A2, the minimum laying unit is set to 1 symbol, the sync intervals i_sper is set to 24 bits, and the radius i_rad of the signal light area A2 is set to 156 pixels.

In the figure, a void portion indicates an area surrounded by four syncs, a wavy line portion indicates an area surrounded by three syncs, a slanting line portion indicates an area surrounded by two syncs, a screen portion indicates an area surrounded by one sync, and a black portion indicates an area not surrounded by syncs or a sync itself.

Figure 12:
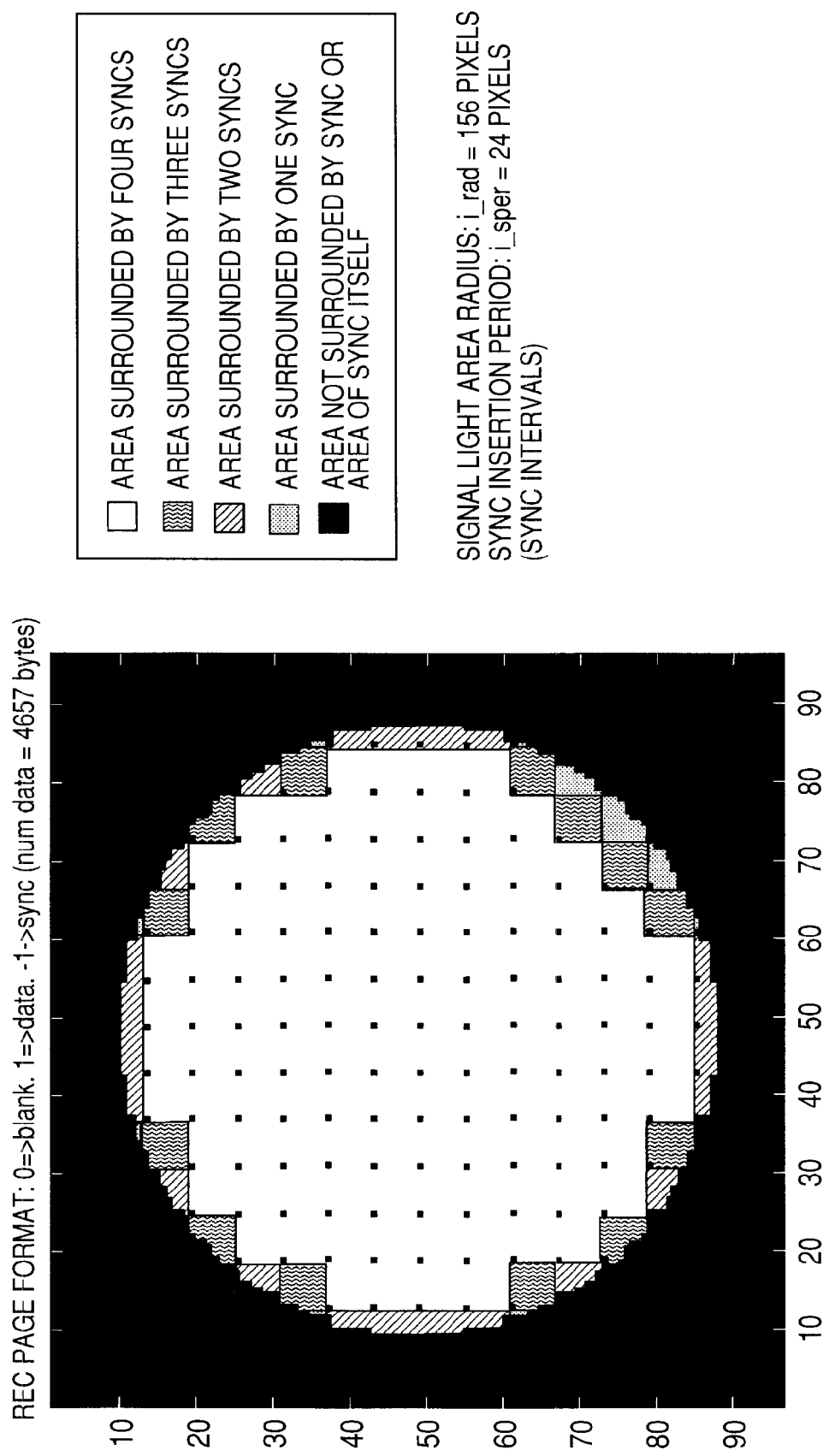
FIG. 12 is a diagram showing a distribution in the signal light area for respective areas divided according to the numbers of syncs that surround the areas.

As shown in FIG. 12, when the recording format according to this embodiment is adopted, in the signal light area A2, most areas are areas surrounded by syncs at four corners thereof. However, in the outer peripheral portion of the signal light area A2, there are areas not surrounded by syncs at four corners thereof. As patterns of the areas, there are three patterns in total, i.e., three places among four corners are surrounded by syncs (the wavy line portion), only two places are surrounded by syncs (the slanted line portion), and only one place is surrounded by a sync (the screen portion).

Figure 13:
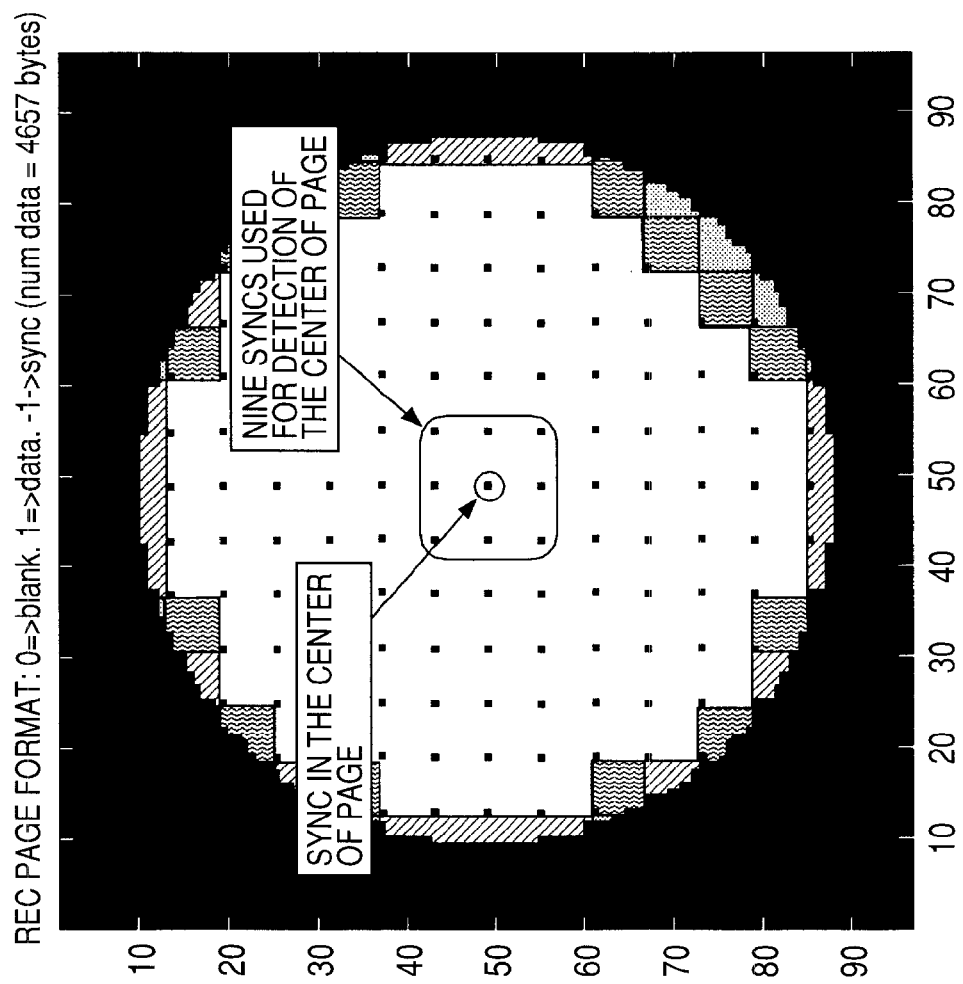
FIG. 13 is a diagram for explaining a method of detecting a page center position.
Figure 14:
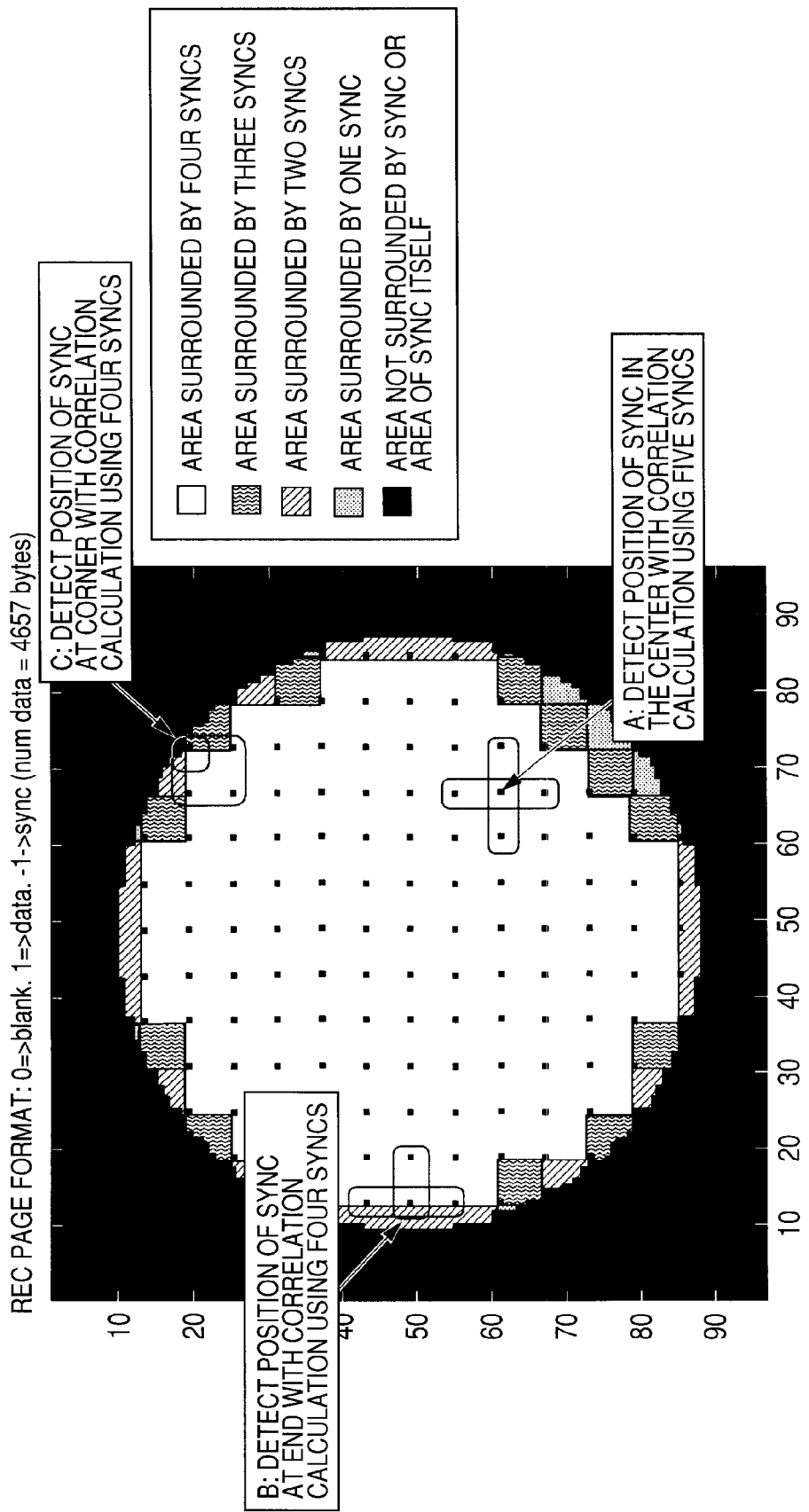
FIG. 14 is a diagram for explaining a method of detecting respective sync positions.

In FIGS. 13 and 14, as in FIG. 12, a void portion indicates an area surrounded by four syncs, a wavy line portion indicates an area surrounded by three syncs, a slanting line portion indicates an area surrounded by two syncs, a screen portion indicates an area surrounded by one sync, and a black portion indicates an area not surrounded by syncs or a sync itself.

[Detection of Sync Positions]

First, a method of detecting a center position of a page is explained with reference to FIG. 13.

As described above, in the case of this embodiment, since the page sync in the past is abolished, it is difficult to perform the rough alignment of the entire page by the page sync. Thus, in this embodiment, the rough alignment of the entire page is performed with a center sync arranged to be a symbol position in the center of the page as a reference (this is referred to as "position detection of a page center").

By performing such rough alignment of the entire page, as in the past, it is possible to narrow down a search range for correlation calculation in detecting respective sync positions later. Consequently, a reduction in calculation processing load during the sync position detection and a reduction in a detection time are realized.

In this embodiment, during such position detection of a page center, the detection is performed using plural syncs selected with a sync in the page center, which should be detected, as a reference.

Specifically, as shown in FIG. 13, the detection of a sync position in the center is performed using nine syncs in total including the sync in the page center and nearest eight syncs around the sync. In other words, the detection of a sync position in the center is performed using nine syncs in total arrayed in a square shape of 3×3 around the sync in the center.

As a specific procedure of the sync position detection in this case, first, a position where a sync in a page center should be present in the signal subjected to the over-sampling and the up-convert is estimated from the recording format.

Correlation values between amplitude values in respective sync positions and sync patterns at the time when the nine syncs in an interval and position relation decided in advance shown in FIG. 13 are moved in such a manner as to move the nine syncs in a predetermined range including the estimated position where the sync in the center should be present are calculated and a total value of the correlation values is calculated. As a result, a position of the sync in the center at the time when the total value of the correlation values in the respective sync positions is finally specified as a position of the page center.

The plural syncs used for the detection of such a page center position can be increased to, for example, 5×5 and 7×7. In that case, it is possible to improve the position detection accuracy. However, when the number of syncs used for sync detection is increased in this way, correlation calculation is complicated, leading to an increase in a calculation processing load and a delay in detection. In this way, the improvement of the position detection accuracy and the reduction in a processing load and a detection time are in a tradeoff relation. The number of syncs used for sync detection only has to be appropriately set to an optimum value according to actual processing speed.

When the detection of a page center position is performed, the detection of respective sync positions is performed on the basis of the center position.

In the case of this embodiment, the detection of respective sync positions is also performed using plural syncs selected with an object sync as a reference.

The detection of respective sync positions using the plural syncs is performed as shown in FIG. 14.

First, basically, as shown in (a) in the figure, the detection of the object sync is performed using five syncs in total, i.e., the object sync and four syncs adjacent to the object sync in the four directions.

Specifically, first, with the detected page center position as a reference, a position where the object sync should be present in the signal subjected to the over-sampling and the up-convert is estimated from the recording format. For example, a distance from the page center to the object sync is known from the recording format. Thus, a position apart from the detected sync position in the page center by the distance only has to be estimated as the object sync position.

Correlation values between amplitude values in respective sync positions and sync patterns at the time when the five syncs in an interval and position relation decided in advance shown in (a) in FIG. 14 are moved as a whole in such a manner as to move the five syncs in a predetermined range including the estimated position where the object sync should be present are calculated and a total value of the correlation values are calculated. Then, a position of the center sync at the time when the total value of the correlation values in the respective sync positions is the largest is finally specified as a position of the object sync.

The accuracy of the sync position estimated on the basis of the page center position specified in advance as described above can be set higher than the accuracy of a sync position estimated from only the recording format without performing the detection of a page center position.

Since the accuracy of an estimated position of the object sync is high in this way, even if the range of the correlation calculation (a search range) during the detection of a sync is set narrower than that at the time when the detection of a page center position is not performed, it is possible to prevent deterioration in detection accuracy. In this regard, in the case of this embodiment in which, after the detection of a page center position, the detection of respective sync positions is performed on the basis of the center position, a reduction in the search range (the correlation calculation range) and a reduction in a calculation processing load and a detection time are realized.

In the signal light area A2, it is assumed that syncs adjacent to the object sync in the four directions (i.e., nearest to the center sync) are present in most sync positions as described above. However, as shown in FIG. 14, in particular, in the outer peripheral portion in the signal light area A2, all syncs in the four directions nearest to the object sync may not be present.

Specifically, only one sync among the syncs in the four directions is absent as shown in (b) in FIG. 14 or two syncs among the syncs in the four directions are absent as shown in (c) in FIG. 14.

When only one sync among the syncs in the four directions is absent as shown in (b) in FIG. 14, the position detection of the object sync is performed using four syncs in total excluding the absent sync. For example, as indicated by (b) in FIG. 14, when the sync on the left among the syncs in the four directions is absent, a position of the object sync is detected using four syncs in total, i.e., the object sync and the three syncs present above, below, and on the right of the object sync.

In this case, as in the above case, a detection operation itself only has to be performed by a correlation detection system same as that at the time when the five syncs are used. For confirmation, with the detected page center position as a reference, a position where the object sync should be present in the signal subjected to the over-sampling and the up-convert is estimated from the recording format. Correlation values between amplitude values in respective sync positions and sync patterns at the time when the four syncs in an interval and position relation decided in advance shown in (b) in FIG. 14 are moved as a whole in such a manner as to move the sync in the center (i.e., the object sync) in a predetermined range around the position where the object sync should be present are calculated and a total value of the correlation values is calculated. A position of the center sync at the time when the total value of the correlation values is the largest is finally specified as a position of the object sync.

When two syncs among the syncs in the four directions are absent as shown in (c) in FIG. 14, the position detection is performed using four syncs in total including a sync in an oblique position nearest to the object sync. For example, as indicated by (c) in FIG. 14, when syncs above and on the right of the object sync among the syncs in the four directions are absent, the position detection of the object sync is performed using four syncs in total, i.e., the present syncs on the left and below the object sync and a sync obliquely below the object sync in an oblique position nearest to the object sync among the present syncs.

In this case, as in the above case, as a sync detection operation itself, an operation based on a correlation detection system same as above is performed.

When the detection of the respective syncs is performed, as in the above case, it is possible to realize further improvement of the position detection accuracy when the correlation detection is performed using a larger number of syncs. However, since the improvement of accuracy and the complication of calculation are in a tradeoff relation as described above, in this case, as in the above case, an optimum value should be set as the number of syncs used for the sync detection according to actual processing speed.

[Re-Sampling]

After the detection of respective sync positions is performed as described above, in order to identify values of respective recording bits corresponding to a one pixel unit of the SLM 3 as data, re-sampling to a pixel size of 1×1 is performed. Positions of respective pixels are specified in the signal subjected to the over-sampling and the up-convert and amplitude values of the respective pixel positions are calculated.

As re-sampling according to this embodiment, rather than specifying a position of an object pixel from only one sync as in the past, a position of an object pixel is specified on the basis of plural syncs. In the technique in the past, a positions of an object pixel is specified on the basis of one sync, for example, pixel positions in a certain sub-page are specified on the basis of positions of sub-page syncs in the sub-page. On the other hand, in this embodiment, a position of an object pixel is specified using plural syncs.

As a method of specifying pixel positions using plural syncs, in this embodiment, a new method of using four syncs that surround a position of an object pixel and calculating a pixel position by performing two-dimensional interpolation processing from the four syncs is adopted.

However, when such a method of specifying (a method of calculating) a pixel position is adopted, it has to be taken into account that the number of syncs that surround a position of an object pixel is less than four. This is because, for example, as it is seen with reference to FIG. 12, in particular, in the outer peripheral portion in the signal light area A2, there are areas in which the number of syncs that surround a position of an object pixel is only three to one.

Therefore, in portions where the number of syncs that surround a position of an object pixel is less than four, an absent sync is extrapolated using the syncs present on the inner side to make it possible to calculate a pixel position using four syncs in all areas.

FIGS. 15A to 15D to FIGS. 17A to 17D are diagrams for explaining a specific method of such extrapolation of a sync.

In the respective figures, only an area for four sub-pages (2×2) is extracted and shown. Syncs inserted in respective areas corresponding to one sub-page in the area for four sub-pages are called sync_1, sync_2, sync_3, and sync_4 in an order of upper left end, upper right end, lower left end, and lower right end.

In the following explanation, a coordinate plane with an ordinate set as i and an abscissa set as j is assumed. Coordinates of the sync_1 to the sync_4 are defined as follows:
sync_1(i,j,1)ordinate of sync_1
sync_1(i,j,2)abscissa of sync_1
sync_2(i,j,1)ordinate of sync_2
sync_2(i,j,2)abscissa of sync_2
sync_3(i,j,1)ordinate of sync_3
sync_3(i,j,2)abscissa of sync_3
sync_4(i,j,1)ordinate of sync_4
sync_4(i,j,2)abscissa of sync_4

"s_row" and "s_col" in the following explanation indicate sync intervals in symbol units. When the intervals i_sper are set to 24 as in this embodiment, s_row=s_col=24/4=6.

In FIGS. 15A to 15D, a method of extrapolating a sync at the time when there are three syncs that surround a position of an object pixel is shown.

The sync_1, the sync_2, the sync_3, and the sync_4 are absent as a sync that surrounds the object pixel in FIGS. 15A to 15D, respectively.

Figure 15A:
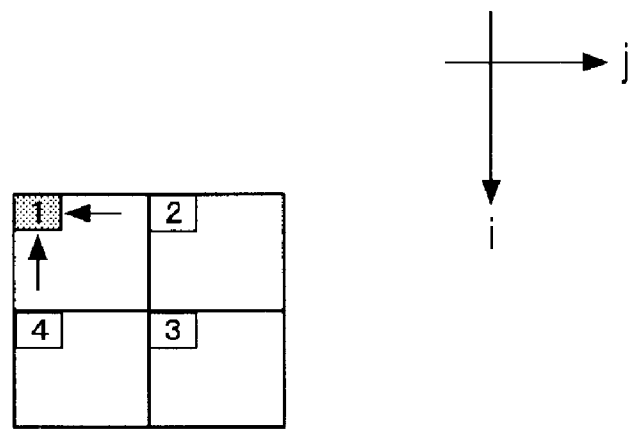
FIGS. 15A to 15D are diagrams for explaining a method of extrapolating one sync in an area when the area is surrounded by three syncs.

For example, when sync_1 is absent as shown in FIG. 15A, the ordinate of sync_2 is substituted in the ordinate of sync_1 according to sync_1(i,j,1)←sync_2(i,j,1) and the abscissa of the sync_4 is substituted as the abscissa of the sync_1 according to sync_1(i,j,2)←sync_4(i,j,2). Consequently, it is possible to extrapolate the absent sync_1 in this case.

In this way, when one sync among four syncs that should surround the position of the object pixel is absent, an ordinate of a sync present on an extended line in the abscissa direction of the absent sync and an ordinate of a sync present on an extended line in the ordinate direction of the absent sync are substituted, respectively, to perform extrapolation of the absent sync.

Figure 15B:
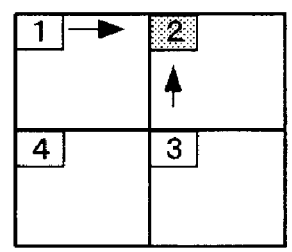
Figure 15C:
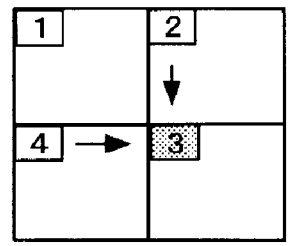
Figure 15D:
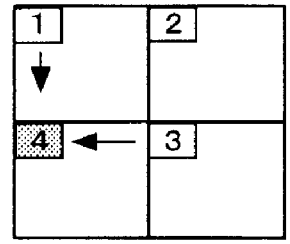

In the cases of FIGS. 15B, 15C, and 15D, methods same as the above only have to be adopted.

A specific extrapolation method is described below.
In the case of FIG. 15B, the sync_2 is extrapolated:
sync_2(i,j,1)←sync_1(i,j,1); and
sync_2(i,j,2)←sync_3(i,j,2).
In the case of FIG. 15C, sync_3 is extrapolated:
sync_3(i,j,1)←sync_4(i,j,1); and
sync_3(i,j,2)←sync_2(i,j,2).
In the case of FIG. 15D, sync_4 is extrapolated:
sync_4(i,j,1)←sync_3(i,j,1); and
sync_4(i,j,2)←sync_1(i,j,2).

In FIGS. 16A to 16F, there are two syncs that surround a position of an object pixel. The sync_1 and the sync_2, the sync_2 and the sync_3, the sync_3 and the sync_4, the sync_4 and the sync_1, the sync_1 and the sync_3, and the sync_2 and the sync_4 are absent in FIGS. 16A to 16F, respectively.

Figure 16A:
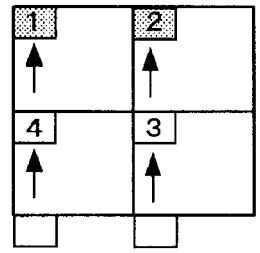
FIGS. 16A to 16F are diagrams for explaining a method of extrapolating two syncs in an area when the area is surrounded by two syncs.

For example, the sync_1 and the sync_2 are extrapolated as shown in FIG. 16A. Assuming that a difference between an ordinate sync_4(i,j,1)=sync_1(i+s_row,j,1) of the sync_4 below the sync_and sync_1(i+2*s_row,j,1) below the sync_4 is equal to a difference between sync_1(i,j,1) and sync_1(i+s_row,j,1), sync_1(i,j,1) as the ordinate of the sync_1 can be calculated by the following procedure:

sync_1(i,j,1)
←2*sync_1(i+s_row,j,1)-sync_1(i+2*s_row,j,1).

Assuming that sync_1(i,j,2) as the abscissa of the sync_1 is the same as sync_4(i,j,2)=sync_1(i+s_row,j,2), the abscissa of the sync_1 can be substituted by the following procedure:

sync_1(i,j,2)←sync_4(i,j,2).

Similarly, assuming that a difference between an ordinate sync_3(i,j,1)=sync_2(i+s_row,j,1) of the sync_3 below the sync_2 and sync_2(i+2*s_row,j,1) below the sync_3 is equal to a difference between sync_2(i,j,1) and sync_2(i+s_row,j,1), sync_2(i,j,1) as the ordinate of the sync_2 can be calculated by the following procedure:

sync_2(i,j,1)
←2*sync_2(i+s_row,j,1)-sync_2(i+2*s_row,j,1).

Assuming that sync_2(i,j,2) as the abscissa of the sync_2 is the same as sync_3(i,j,2)=sync_2(i+s_row,j,2), the abscissa of the sync_2 can be substituted by the following procedure:

sync_2(i,j,2)←sync_3(i,j,2).

Figure 16B:
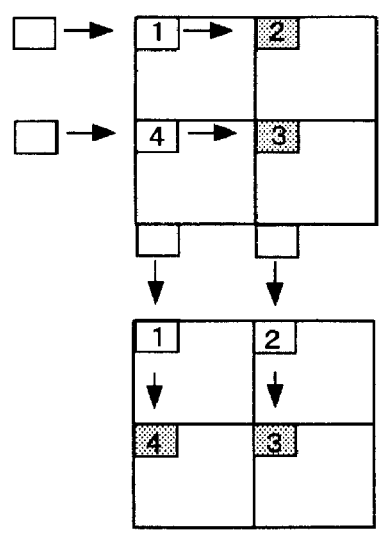
Figure 16C:
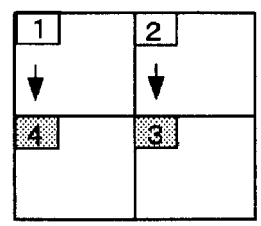
Figure 16D:
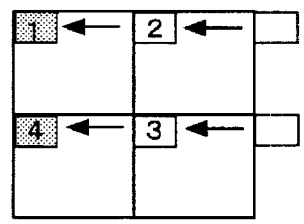

In FIGS. 16B to 16D, although there is a difference in vertical and horizontal directions, the same procedure only has to be taken.

In the case of FIG. 16B, the sync_2 and the sync_3 are extrapolated:

sync_2(i,j,1)←sync_1(i,j,1);
sync_2(i,j,2)
←2*sync_2(i,j-s_col,2)-sync_2(i,j-2*s_col,2);
sync_3(i,j,1)←sync_4(i,j,1); and
sync_3(i,j,2)
←2*sync_3(i,j-s_col,2)-sync_3(i,j-2*s_col,2).

In the case of FIG. 16C, the sync_3 and the sync_4 are extrapolated:

sync_3(i,j,1)
←2*sync_3(i-s_row,j,1)-sync_3(i-2*s_row,j,1);
sync_3(i,j,2)←sync_2(i,j,2);
sync_4(i,j,1)
←2*sync_4(i-s_row,j,1)-sync_4(i-2*s_row j,1); and
sync_4(i,j,2)←sync_1(i,j,2).

In the case of FIG. 16D, the sync_4 and the sync_1 are extrapolated:

sync_4(i,j,1)←sync_3(i,j,1);
sync_4(i,j,2)
←2*sync_4(i,j+s_col,2)-sync_4(i,j+2*s_col,2);
sync_1(i,j,1)←sync_2(i,j,1); and
sync_1(i,j,2)
←2*sync_1 (i,j+s_col,2)-sync_1(i,j+2*s_col,2).

Figure 16E:
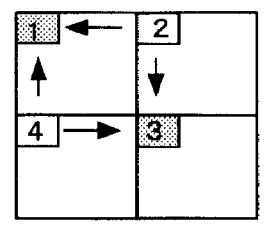
Figure 16F:
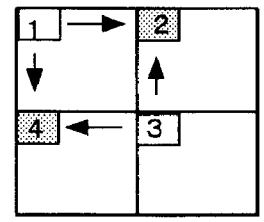

On the other hand, in FIGS. 16E and 16F, two syncs present in oblique directions of the object sync are extrapolated. In FIG. 16E, the sync_1 and the sync_3 are extrapolated. In this case, assuming that the ordinate of the sync_1 coincides with the ordinate of the sync_2 and the abscissa of the sync_1 coincides with the abscissa of the sync_4, the sync_1 can be extrapolated by the following procedure:

sycn_1(i,j,1)←sync_2(i,j,1); and
sync_1(i,j,2)←sync_4(i,j,2).

Assuming that the ordinate of the sync_3 coincides with the ordinate of the sync_4 and the abscissa of the sync_3 coincides with the abscissa of the sync_2, the sync_3 can be extrapolated by the following procedure:

sync_3(i,j,1)←sync_4(i,j,1); and
sync_3(i,j,2)←sync_2(i,j,2).

Similarly, in the case of FIG. 16F, the sync_2 and the sync_4 only have to be extrapolated in the following procedure:

sync_2(i,j,1)←sync_1(i,j,1);
sync_2(i,j,2)←sync_3(i,j,2);
sync_4(i,j,1)←sync_3(i,j,1); and
sync_4(i,j,2)←sync_1(i,j,2).

The situations in FIGS. 16E and 16F do not occur when the recording format described above as an example (the minimum laying unit is 1 symbol, the radius i_rad is 154 pixels, the sync size is 1 symbol, and the sync intervals i_sper are 24 bits) is adopted. However, when formats other than the recording format are adopted, it is likely the situations occur. In that case, the extrapolation of syncs by the methods described above only has to be performed.

In FIGS. 17A to 17D, there is only one sync that surrounds a position of an object pixel.

Only the sync_4, only the sync_3, only the sync_2, and only the sync_1 are present in FIGS. 17A to 17D, respectively.

Figure 17A:
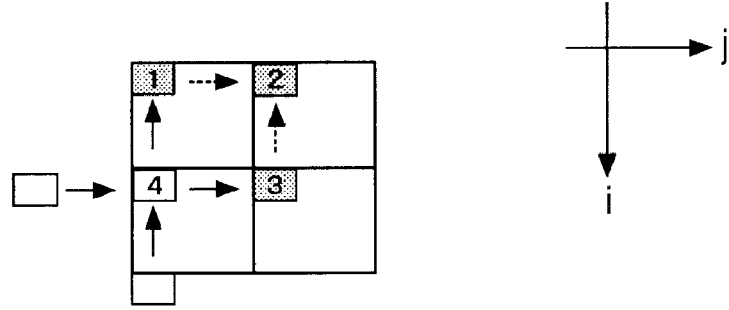
FIGS. 17A to 17D are diagrams for explaining a method of extrapolating three syncs in an area when the area is surrounded by one sync.

In FIG. 17A, only the sync_4 is present. In this case, assuming that a difference between an ordinate sync_4(i,j,1)=sync_1(i+s_row,j,1) of the sync_4 immediately below the sync_1 and sync_1(i+2*s_row,j,1) two syncs below the sync_1 is equal to a difference between sync_1(i,j,1) and sync_1(i+s_row,j,1), an ordinate sync_1(i,j,1) of the sync_1 can be interpolated by the following procedure:

sync_1(i,j,1)
←2*sync_1(i+s_row,j,1)-sync_1(i+2*s_row,j,1).

In this case, the abscissa sync_1(i,j,2) of the sync_1 may be the same as the abscissa sync_4(i,j,2) of the sync_4.

An ordinate sync_3(i,j,1) of the sync_3 may be the same as sync_4(i,j,1). Assuming that a difference between the abscissa sync_4(i,j,2)=sync_3(i,j-s_col,2) of the sync_4 immediately on the left of the sync_3 and sync_3(i,j-2*s_col,2) two syncs on the left of the sync_3 is equal to a difference between sync_3(i,j,2) and sync_3(i,j-s_col,2), the abscissa sync_3(i,j,2) of the sync_3 can be extrapolated by the following procedure:

sync_3(i,j,2)
←2*sync_3(i,j-s_col,2)-sync_3(i,j-2*s_col,2).

Moreover, assuming that the ordinate of the sync_2 is equal to the ordinate of the sync_1 and the abscissa of the sync_2 is equal to the abscissa of the sync_3, the sync_2 can be extrapolated by the following procedure:

sync_2(i,j,1)←sync_1(i,j,1); and
sync_2(i,j,2)←sync_3(i,j,2).

Figure 17B:
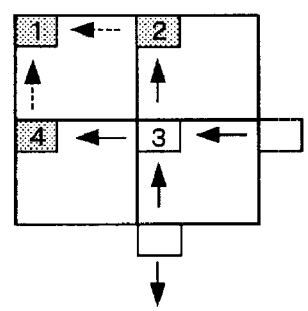
Figure 17C:
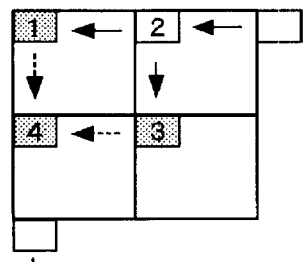
Figure 17D:
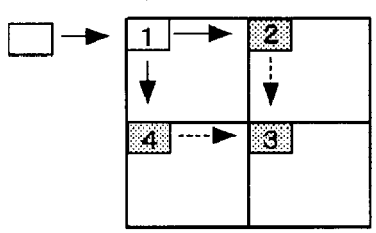

In the respective cases in FIGS. 17B to 17D, the syncs can be extrapolated on the basis of the same idea.

In the case of FIG. 17B, the sync_2, the sync_4, and the sync_1 are extrapolated:

sync_2(i,j,1)
←2*sync_2(i+s_row,j,1)-sync_2(i+2*s_row,j,1);
sync_2(i,j,2)←sync_3(i,j,2);
sync_4(i,j,1)←sync_3(i,j,1);
sync_4(i,j,2)
←2*sync_4(i,j+s_col,2)-sync_4(i,j+2*s_col,2);
sync_1(i,j,1)←sync_2(i,j,1); and
sync_1(i,j,2)←sync_4(i,j,2).

In the case of FIG. 17C, the sync_1, the sync_3, and the sync_4 are extrapolated:

sync_1(i,j,1)←sync_2(i,j,1);
sync_1(i,j,2)
←2*sync_1(i,j+s_col,2)-sync_1 (i,j+2*s_col,2);
sync_3(i,j,1)
←2*sync_3(i-s_row,j,1)-sync_3(i-2*s_row j,1);
sync_3(i,j,2)←sync_2(i,j,2);

sync_4(i,j,1)←sync_3(i,j,1); and
sync_4(i,j,2)←sync_1(i,j,2).

In the case of FIG. 17D, the sync_2, the sync_4, and the sync_3 are extrapolated:
sync_2(i,j,1)←sync_1(i,j,1);
sync_2(i,j,2)
←2*sync_2(i,j−s_col,2)−sync_2(i,j−2*s_col,2);
sync_4(i,j,1)
←2*sync_4(i−s_row,j,1)−sync_4(i−2*s_row j,1);
sync_4(i,j,2)←sync_1(i,j,2);
sync_3(i,j,1)←sync_4(i,j,1); and
sync_3(i,j,2)←sync_2(i,j,2).

For example, according to the method described above, it is possible to extrapolate syncs such that respective pixel positions in a page are surrounded by the syncs from the four directions.

In this embodiment, after setting all the pixel positions to be surrounded by the syncs from the four directions, a position of an object pixel is calculated (specified) by performing linear interpolation using the four syncs that surround the pixel position.

Figure 18A:
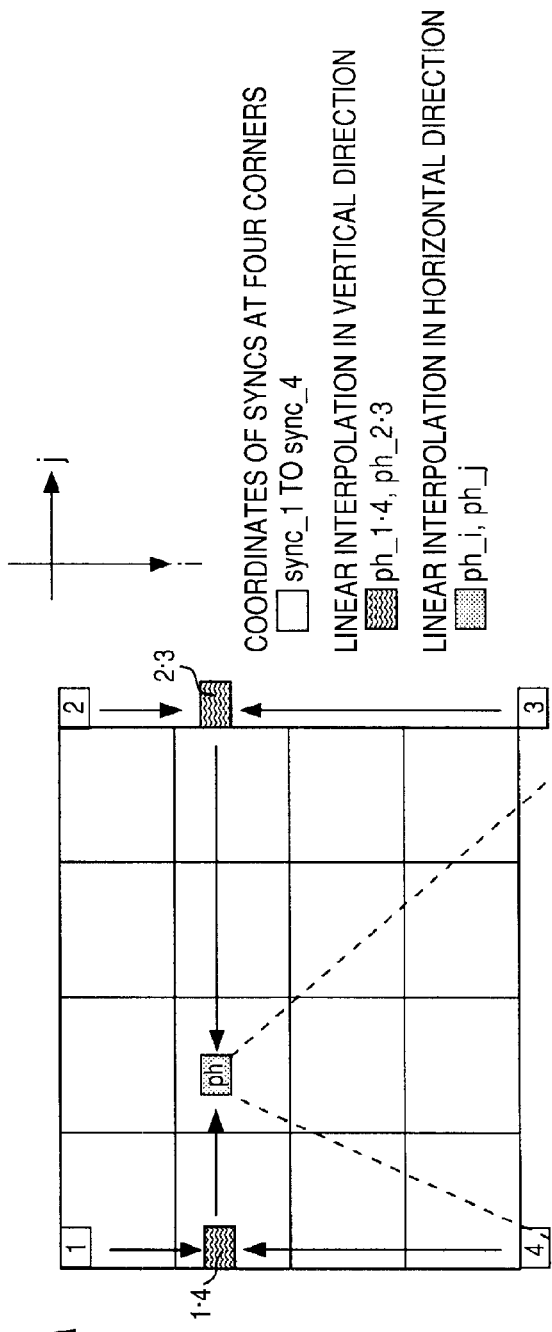
FIGS. 18A and 18B are diagrams for explaining a re-sampling method according to an embodiment.

FIG. 18A is a diagram for explaining such a re-sampling method according to this embodiment and shows an object pixel position (ph) and four syncs (the sync_1 to the sync_4) that surround the pixel position.

In FIG. 18A, an area surrounded by the syncs at four corners (the sync_1 to the sync_4) is shown as an area for 16 blocks (4×4). However, as explained above, when the sync intervals i_sper=24 bits are set as the recording format according to this embodiment, the area surrounded by the four syncs (the sync_1 to the sync_4) is an area for one sub-page (6 symbols×6 symbols).

In performing re-sampling for a certain pixel position (an object pixel position), four syncs that surrounds the object pixel position is determined from coordinates of the object pixel position. The re-sampling is performed according to a procedure described below using the four syncs determined in this way.

First, for example, it is assumed that, with a position of the sync_1 at the upper left end as a referent, the object pixel position is in a position apart from the sync_1 downward by nr bits and to the right by mc bits. After defining the object pixel position with the position of the sync_1 and nr and mc, an ordinate phi of the object pixel can be calculated by, after performing the following linear interpolation in the vertical direction to calculate ph_1·4_i and ph_2·3_i in the figure by using sync_1·sync_4 and sync_2·sy2c_3 ph_1·4_i={(i_sper−nr)*sync_1(i,j,1)+nr*sync_4(i,j,1)}/i_sper; and
ph_2·3_i={(i_sper−nr)*sync_2(i,j,1)+nr*sync_3(i,j,1)}/i_sper, further performing the following linear interpolation in the vertical direction using ph_1·4_i and ph_2·3_i:
phi={(i_sper−mc)*ph_1·4_i+mc ph_2·3_i}/i_sper.

It is expected that this value has a value of decimals because alignment (detection of respective sync positions) after the over-sampling and the up-convert is performed. Thus, the value is divided into an integer part phi_int of the ordinate and a decimal part phi_flt of the ordinate as follows:
phi_int=floor(phi); and
phi_flt=phi−phi_int.

Similarly, an abscissa phj of the object pixel position can be calculated by, after performing the following linear interpolation in the horizontal direction:
ph_1·4_j={(i_sper−nr)*sync_1(i,j,2)+nr*sync_4(i,j,2)}/i_sper; and
ph_2·3_j={(i_sper−nr)*sync_2(i,j,2)+nr*syunc_3(i,j,2)}/i_sper, further performing the following linear interpolation in the horizontal direction using ph_1·4_j and ph_2·3_j:
phj={(i_sper−mc)*ph_1·4_j+mc*ph_2·3_j}/i_sper.

This value is also divided into an integer part phj_int of the abscissa and a decimal part phj_flt of the abscissa as follows:
phj_int=floor(phj); and
phj_flt=phj−phj_int.

A position of a pixel specified by the ordinate phi and the abscissa phj calculated by the linear interpolation in the vertical direction and the linear interpolation in the horizontal direction using the syncs at the four corners is the object pixel position. In other words, the calculation of the ordinate phi and the abscissa phj is equivalent to the calculation (detection) of the object pixel position.

By adopting such pixel position calculation by the linear interpolation, it is possible to properly specify respective pixel positions even when lights of the respective pixels of the SLM are not irradiated on ideal positions on the image sensor 6 because of optical distortion and the like.

After calculating the ordinate phi and the abscissa phj of the object pixel position as described above, an amplitude value of the pixel position is calculated.

Figure 18B:
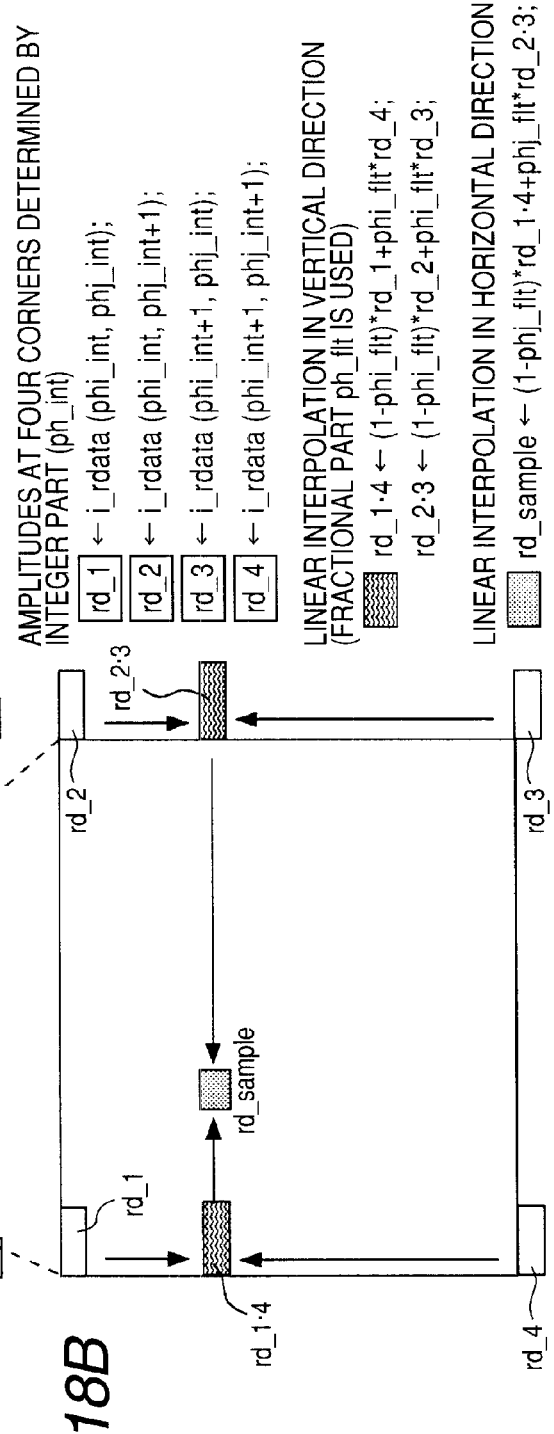

FIG. 18B shows a method of calculating an amplitude value of a pixel according to this embodiment.

In this embodiment, a method using linear interpolation is adopted for the calculation of an amplitude value of a pixel as well. Specifically, linear interpolation using amplitude values (rd_1, rd_2, rd_3, and rd_4 in the figure) at four corners that surround the object pixel position specified as describe above is performed to calculate an amplitude value of the object pixel.

In calculating an amplitude value, the amplitude values rd_1, rd_2, rd_3, and rd_4 at the four corners that surround the object pixel position are defined as follows:
rd_1=i_rdata(phi_int,phj_int);
rd_2=i_rdata(phi_int,phj_int+1);
rd_3=i_rdata(phi_int+1,phj_int); and
rd_4=i_rdata(phi_int+1,phj_int+1).

These amplitude values rd_1, rd_2, rd_3, and rd_4 are signal amplitude values in positions of the four corners that surround the object pixel position specified by only the integer part phi_int of the ordinate and the integer part phj_int of the abscissa obtained by the calculation described above.

Strictly speaking, the amplitude value rd_1 at the upper left end among the signal amplitudes rd_1, rd_2, rd_3, and rd_4 at the four corners is a value in the object pixel position. However, for convenience of explanation, rd_2, rd_3, and rd_4 including rd_1 are defined as the amplitude values in the positions at the four corners that surround the object pixel position.

Linear interpolation in the vertical direction using the amplitude values rd_1, rd_2, rd_3, and rd_4 and the decimal coordinates obtained by the above calculation is performed as follows:
rd_1·4=(1−phi_flt)*rd_1+phi_flt*rd_4; and
rd_2·3=(1−phi_flt)*rd_2+flt*rd_3.

Finally, linear interpolation in the horizontal direction is performed as described below using rd_1·4 and rd_2·3, which are obtained by performing the linear interpolation in the vertical direction, and the decimal coordinates.
rd_sample=(1−phj_flt)*rd_1·4+phj_flt*rd_2·3.

rd_sample obtained here is an amplitude value of a pixel in the object pixel position. In FIG. 18B, an image of rd_sample decided by the linear interpolation in the vertical direction and the linear interpolation in the horizontal direction is shown.

Since the method of calculating an amplitude value of a pixel using the linear interpolation is adopted, it is possible to properly perform calculation of amplitude values of respective pixels even when lights of the respective pixels of the SLM are not irradiated on ideal positions on the image sensor 6 because of optical distortion and the like.

[Data Identification]

By applying the re-sampling described above to positions of respective pixels in a page, it is possible to obtain amplitude values of the respective pixels in the page. Consequently, it is possible to re-sample data in the page to 1×1.

In this case, as in the above case, the data in the page is subjected to sparse encoding in symbol units, it is possible to detect final values of respective recording bits of "0" and "1" by performing data identification by sort detection according to the sparse encoding.

Sparse codes are decoded for each of the symbols of the data to finally convert the detected respective bit values from 1 symbol into 1 bytes (8 bits). It is possible to reproduce recording data by outputting the data for 1 symbol (1 byte) decoded in this way in an order of data numbers of the symbols. Consequently, it is possible to obtain reproduced data.

4-3. Structure of the Signal Processing Unit

The internal structure of the data reproducing unit 7 shown in FIG. 1 for realizing the reproducing method according to this embodiment is shown in FIG. 19.

As shown in the figure, the data reproducing unit 7 includes a moving average filter 22, an up-convert unit 23, a sync detecting unit 24, a re-sampling unit 25, a data identifying unit 26, and a sparse-code decoding unit 27.

Outputs (readout signal amplitude values) from the image sensor 6 shown in FIG. 1 are supplied to the moving average filter 22 in the data reproducing unit 7.

As described above, in the recording and reproducing apparatus 1 according to this embodiment, the number of effective pixels of the image sensor 6 is set to be, for example, four times as large as the number of effective pixels of the SLM 3 in advance to receive light for one pixel of the SLM 3 with four (2×2) pixels on the image sensor 6.

The moving average filter 22 is inputted with the readout signal amplitude values from the image sensor 6 over-sampled to 2×2 in this way. In order to improve a frequency characteristic (a spatial frequency characteristic) of the readout signal amplitude values, the moving average filter 22 applies predetermined filter processing such as moving average filtering to the readout signal amplitude values.

The readout signal amplitude values subjected to the filter processing by the moving average filter 22 are supplied to the up-convert unit 23. The up-convert unit 23 interpolates the respective readout signal amplitude values and applies up-convert at a predetermined magnification to the readout signal amplitude values. As described above, in the case of this embodiment, after the 2×2 over-sampling, the up-convert to a pixel size of 4×4 is further performed.

The sync detecting unit 24 is inputted with the respective values up-converted by the up-convert unit 23 and performs sync detection.

Specifically, first, the sync detecting unit 24 detects a sync position in the page center as explained with reference to FIG. 13. Then, on the basis of the detected sync position in the page center, the sync detecting unit 24 performs detection of respective sync positions as explained with reference to FIG. 14.

The re-sampling unit 25 performs re-sampling to a pixel size of 1×1 on the basis of the respective sync positions detected by the sync detecting unit 24.

In the case of the re-sampling method according to this embodiment, all the pixel positions in the signal light area A2 need to be surrounded by four syncs. Therefore, the re-sampling unit 25 performs extrapolation of syncs according to the procedure explained with reference to FIGS. 15 to 17 using the detected syncs.

Then, the re-sampling unit 25 detects positions of pixels according to the procedure explained with reference to FIG. 18A in all the pixel positions in the page using the respective syncs including the syncs extrapolated in this way. Specifically, the re-sampling unit 25 calculates the integer portion phi_int of the ordinate, the decimal portion phi_flt of the ordinate, the integer portion phj_int of the abscissa, and the decimal portion phj_flt of the abscissa for each of the positions of the respective pixels according to the linear interpolation described above.

Moreover, the re-sampling unit 25 calculates amplitude values of the positions of the respective pixels according to the procedure explained with reference to FIG. 18B. Specifically, the re-sampling unit 25 performs the linear interpolation explained above to calculate amplitude values of the respective pixels on the basis of the integer portion phi_int of the ordinate, the decimal portion phi_flt of the ordinate, the integer portion phj_int of the abscissa, and the decimal portion phj_flt of the abscissa for each of the positions of the respective pixels calculated as described above and the amplitude values rd_1, rd_2, rd_3, and rd_4.

The data identifying unit 26 detects final bit values of "0" and "1" from the amplitude values of the respective pixels calculated by the re-sampling unit 24.

As described above, in the case of this embodiment, the sparse code in which 3 bits of 1 symbol including 16 bits are "1" and all the other 13 bits are "0" is used. Thus, as data identification corresponding to the sparse code, sort detection for arranging amplitude values of pixels for 16 bits in an order from one with the largest amplitude value and setting only pixels of higher order 3 pixels to "1" is performed.

In this case, the detected bit values are grouped in symbol units and supplied to the sparse-code decoding unit 27 at the later stage.

For example, in the recording format according to this embodiment, since data numbers are given in symbol units, the data identification is performed for each of symbols conforming to an order of the data numbers. If all bit values in the symbol are sequentially supplied every time the bit values are identified (detected), it is possible to supply the bit values to the sparse-code decoding unit 27 in symbol units.

The sparse-code decoding unit 27 performs decode processing of the sparse code for the bit values supplied from the data identifying unit 26 in symbol units as described above and converts 1 symbol into 1 byte to reproduce recording data. Consequently, reproduced data is obtained.

5. Results of Experiments

Figure 20:
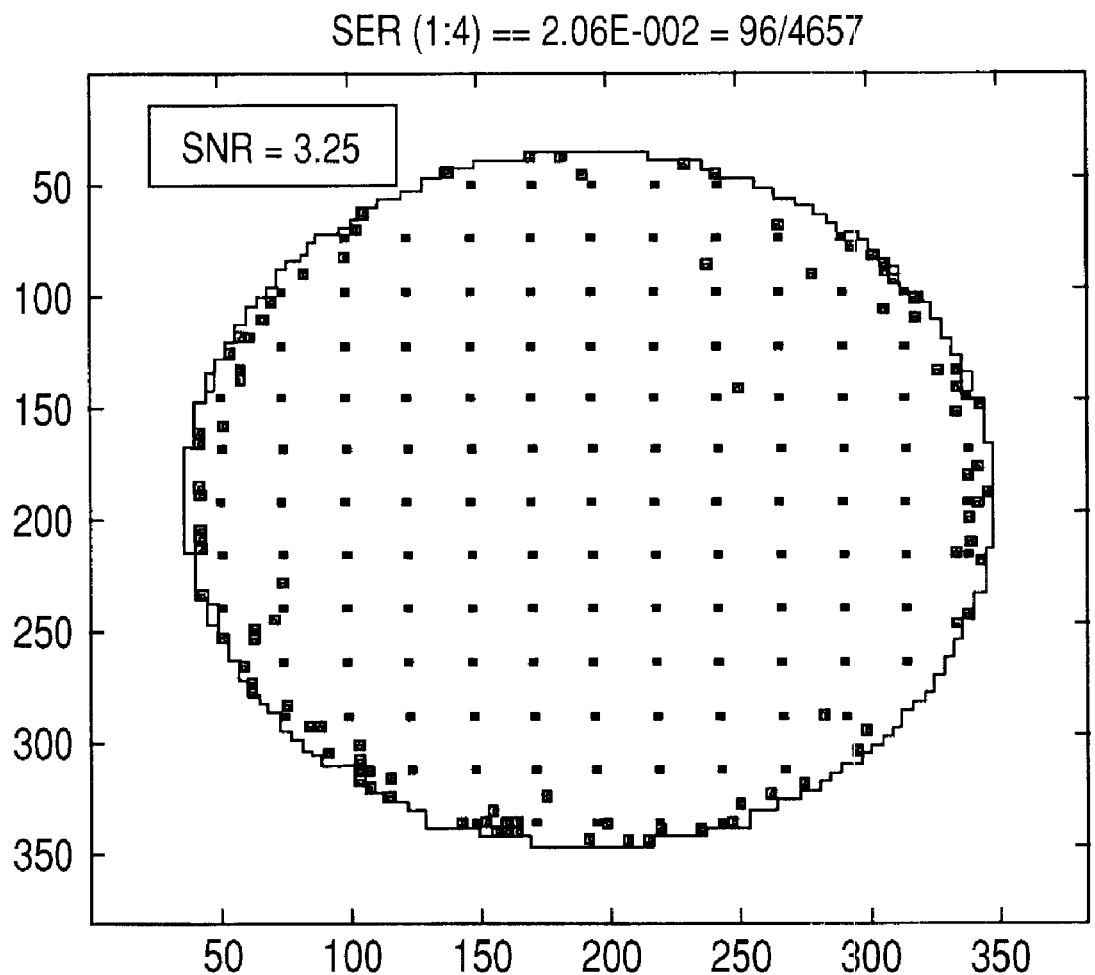
FIG. 20 is a diagram showing results of experiments concerning an error distribution in a page, an SER, and an SNR to which the reproducing method according to an embodiment is applied.
Figure 21:
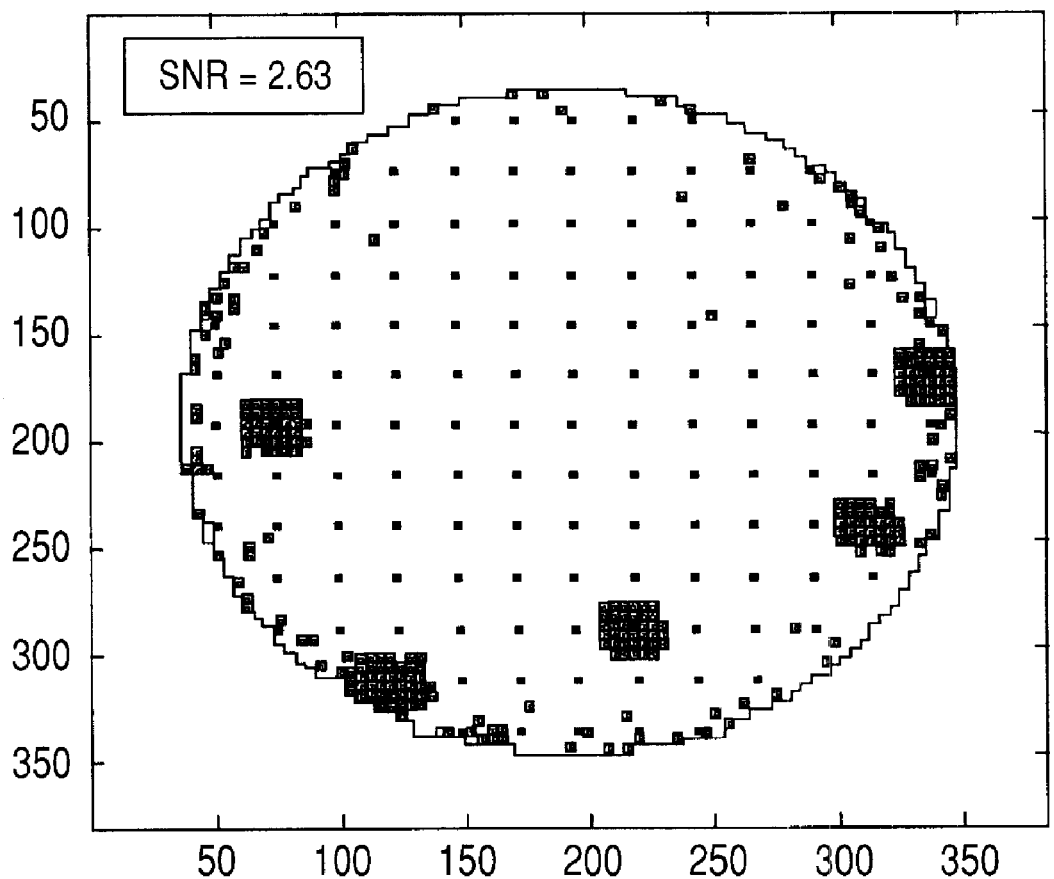
FIG. 21 is a diagram showing results of experiments concerning an error distribution in a page, an SER, and an SNR to which a reproducing method in the past is applied.
Figure 22:
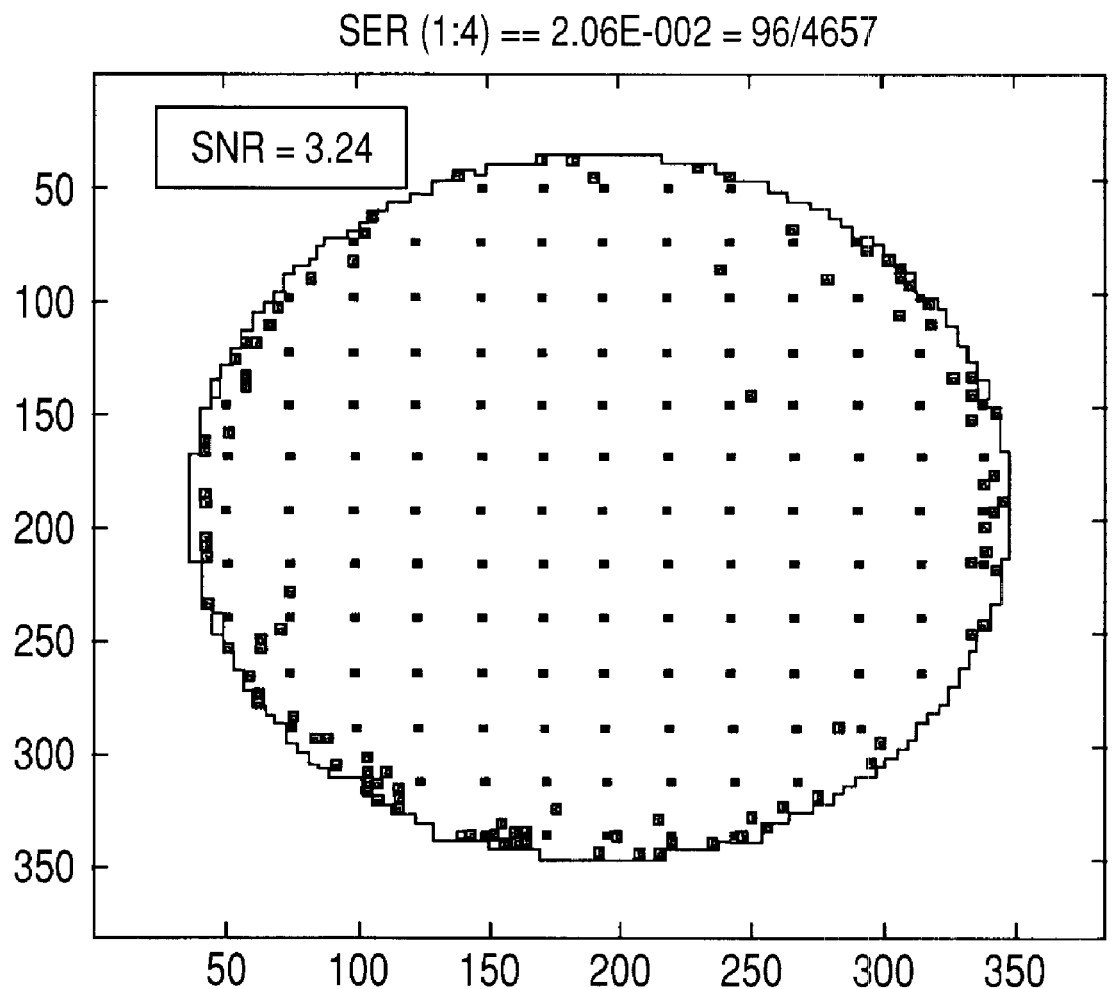
FIG. 22 is a diagram showing results of experiments concerning an error distribution in a page, an SER, and an SNR to which detection of respective syncs according to an embodiment and sampling data identification in the past are applied.

In FIGS. 20 to 22, results of experiments for explaining effectiveness of the reproducing method according to this embodiment explained above are shown.

As results of experiments in which data recorded in the recording format according to this embodiment is actually reproduced, a result of an experiment to which the reproducing method (sync detection, re-sampling, and data identification) according to this embodiment is applied is shown in FIG. 20 and a result of an experiment to which the reproducing method in the past is applied is shown in FIG. 21. A result of an experiment to which only the detection of respective syncs (excluding detection of a page center sync) of the reproducing method according to this embodiment is applied and a method conforming to the method in the past is applied as re-sampling is shown in FIG. 22. Specifically, as the re-sampling conforming to the method in the past, positions of object pixels were selected from a readout signal of 4×4 on the basis of closest syncs to set values of the positions of the pixels as amplitudes values.

In the figures, as specific results of experiments, an error distribution in a page, an SER (Symbol Error Rate), and an SNR (an S/N ratio) are shown. The error distribution in a page is indicated by void squares in the figure. In a double square, an inner frame thereof indicates an error in bit units (a bit error) and an outer frame thereof indicates an error in symbol units (a symbol error).

It is seen that, when the reproducing method in the past is adopted as it is as shown in FIG. 21, errors occur around syncs that are not successfully detected. In particular, the SER is extremely high in the outer peripheral portion that is not used in the recording format in the past (the minimum laying unit is one sub-page). It is difficult to put the reproducing method to practical use. In this case, the SNR was 2.63.

On the other hand, it is seen that, when the reproducing method according to this embodiment shown in FIG. 20 is adopted, the concentration of errors due to the failure in sync detection is substantially relaxed and positions where errors occur are dispersed and the number of the errors is substantially reduced. In this case, the SNR was 3.25.

From this result, it can be understood that, in the reproducing method according to this embodiment explained above, it is possible to properly reproduce data even when the recording format according to this embodiment explained with reference to FIGS. 6 to 10 is adopted, i.e., when the reduction in the minimum laying unit and the reduction in a sync ratio are realized.

When only the detection of respective syncs in the reproducing method according to this embodiment is applied as shown in FIG. 22, compared with the application of the entire reproducing method according to this embodiment shown in FIG. 20, although errors slightly increases, a distribution of the errors is practically the same as that in the case of FIG. 20. Compared with the application of the method in the past in FIG. 21, a substantial reduction in errors is realized. In this case, the SNR was 3.24.

From the result in FIG. 22, it can be understood that, when the reduction in the minimum laying unit and the reduction in the sync ratio are realized as in the recording format according to this embodiment, it is effective to detect respective syncs using plural syncs.

Concerning the method of detecting a sync in the page center using plural syncs, since the method is not a method of determining final sync positions, it is difficult to show an effect with the method alone. However, for example, when edge extraction is performed to recover timing as in a PLL, a position of the page center is determined as final alignment of a page. Thus, in that case, it can be said that the method of deciding a page center position using plural syncs as in this embodiment is more excellent than the method of deciding a page center position using only a sync in one place.

It should be appreciated that a variety of suitable modifications can be made to the subject matter of the present application as described.

For example, as the recording format, in the example explained above, after setting the minimum laying unit to a symbol of 4 bits×4 bits, the radius i_rad of the signal light area A2 is set to 154 pixels, the sync intervals i_sper are set to 24 bits, and the sync size is set to 1 symbol. However, a recording method (a recording format) according to an embodiment only has to be set to at least increase a recording volume from that of the recording format in the past explained with reference to FIGS. 23 to 24. Specifically, the minimum laying unit is not limited to 4 bits×4 bits and only has to be set to 1 symbol that is the minimum unit decided by the adopted record encoding. Consequently, the minimum laying unit can be reduced to a size equal to or smaller than one sub-page including plural symbols.

Besides such reduction in the minimum laying unit, it is also possible to realize an increase in a recording volume by realizing abolishment of the page sync, a reduction in the sync size, an increase in the sync intervals i_sper, and a reduction in the ratio of syncs.

As the reproducing method, in the example explained above, a sync in the page center is detected and, then, respective syncs are detected. However, it is also possible to detect respective syncs without detecting such a page center position. However, as explained above, if the detection of a page center position is performed in advance, it is possible to reduce a search range during the detection of respective syncs.

During the detection of respective syncs, in the specific example explained above, the pattern of a cross shape of five syncs in total including the object sync and the syncs in the four directions around the object sync is used as a basic pattern. However, in detecting respective syncs using plural syncs, the number of syncs used in the detection and a pattern of the syncs can be set arbitrarily.

In the example explained above, during such detection of syncs, the plural syncs including the object sync are used. However, it is also possible to detect the object sync using only plural syncs around the object sync excluding the object sync.

In any case, in the sync detection according to an embodiment, if a position of the object sync is detected on the basis of positions of plural syncs selected with the position of the object sync as a reference, it is possible to prevent the fall in sync position detection accuracy due to the fall in a ratio of syncs.

In the example explained above, in specifying (calculating) positions of pixels, syncs are extrapolated such that all pixel positions in a page are surrounded by syncs from the four directions. However, it is also possible to calculate positions of the respective pixels without performing such extrapolation of the syncs.

In that case, when a sync is not present in any one of the four directions around a position of an object sync, for example, the position of the object pixel only has to be calculated on the basis of positions of all syncs present in the four directions. Alternatively, it is also possible to adopt a method of, for example, calculating positions of pixels on the basis of only a sync position nearest to a position of an object pixel.

In the example explained above, such calculation of positions of pixels is also performed using plural syncs. However, it is also possible to calculate positions of pixels with one sync as a reference as in the past. For example, positions of pixels are calculated on the basis of one sync nearest to a position of an object pixel.

In the example explained above, in obtaining respective bit values from amplitude values of respective pixels finally calculated by re-sampling (i.e., in performing data identification), sort detection same as that in the past is adopted. However, it is also possible to obtain respective bit values from amplitude values of respective pixels according to methods other than the sort detection. For example, it is possible to perform, as a correlation detection method, correlation calculation between amplitude values of respective pixels for 1 symbol calculated by re-sampling and all data patterns (represented by amplitude values) that can be generated as a data pattern of 1 symbol and detect a data pattern having the largest correlation value as a data pattern of the symbol.

In the example explained above, the recording method and the reproducing method according to an embodiment are simultaneously applied to the recording and reproducing apparatus that can perform both recording and reproduction. However, it is possible to apply the recording method according to an embodiment to a recording apparatus that can perform at least recording. Similarly, it is possible to apply the reproducing method according to the embodiment to a reproducing apparatus that can perform at least reproduction.

In the example explained above, the recording method and the reproducing method according to an embodiment are applicable to the reflection hologram recording medium including the reflection film. However, it is also possible to suitably apply the recording method and the reproducing method according to an embodiment to a recording apparatus and a reproducing apparatus applicable to a transmission hologram recording medium not including a reflection film. When the recording method and the reproducing method according to an embodiment are applicable to the transmission hologram recording medium in this way, in the reproducing apparatus, a beam splitter for guiding diffractive light obtained as reflected light according to irradiated reference light to an image sensor can be unnecessary. In this case, since diffractive light obtained according to irradiation of reference light is transmitted through the hologram recording medium itself, an object lens only has to be further provided on the opposite side of the hologram recording medium viewed from a laser beam emission point side to guide diffractive light as transmitted light to the image sensor through the object lens.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A reproducing apparatus that reproduces data from a hologram recording medium in which data inserted with syncs at predetermined intervals is recorded in each predetermined page unit by interference fringes of reference light and signal light, the reproducing apparatus comprising:
reference-light irradiating means for irradiating the reference light on the hologram recording medium;
signal readout means for receiving diffractive light corresponding to the data recorded on the hologram recording medium, which is obtained by the irradiation of the reference light on the hologram recording medium, and obtaining a readout signal;
sync-position detecting means for detecting, in detecting positions of the syncs that should be inserted in the readout signal obtained by the signal readout means, a position of a detection object sync on the basis of positions of plural syncs selected with the position of the detection object sync as a reference; and
amplitude-value calculating means for specifying positions of respective recording pixels in the readout signal on the basis of the positions of the respective syncs detected by the sync-position detecting means and calculating amplitude values of the respective pixels.

2. A reproducing apparatus according to claim 1, wherein the sync-position detecting means detects a position of the object sync on the basis of a result of performing correlation calculation between amplitude values of the readout signal in positions of the respective plural syncs at the time when all the plural syncs are moved in a predetermined range and patterns of the syncs decided in advance.

3. A reproducing apparatus according to claim 1, wherein the sync-position detecting means performs detection of a sync position in a center in the readout signal obtained in the page units and, then, detects positions of the respective syncs in a page with the detected sync position in the page center as a reference.

4. A reproducing apparatus according to claim 1, wherein the sync-position detecting means detects, when there are four syncs adjacent to the object lens in four directions with the object sync as a reference, a position of the object sync on the basis of positions of five syncs in total including the adjacent four syncs and the object sync.

5. A reproducing apparatus according to claim 1, wherein the sync-position detecting means detects, when one of syncs adjacent to the object sync in four directions with the object sync as a reference is not present, a position of the object sync on the basis of positions of four syncs in total including the present three syncs and the object sync.

6. A reproducing apparatus according to claim 1, wherein the sync-position detecting means detects, when two syncs of syncs adjacent to the object sync in four directions with the object sync as a reference are not present, a position of the object sync on the basis of positions of four syncs in total including the present two syncs and a nearest sync adjacent to the object sync in an oblique direction.

7. A reproducing apparatus according to claim 1, further comprising sync extrapolating means for extrapolating syncs such that positions of all pixels included in the readout signal in the page units are surrounded by the syncs from four directions, wherein
the amplitude-value calculating means specifies a position of an object pixel on the basis of positions of four syncs that surround the position of the object pixel.

8. A reproducing apparatus according to claim 1, further comprising sync extrapolating means for extrapolating syncs such that positions of all pixels included in the readout signal in the page units are surrounded by the syncs from four directions, wherein
the amplitude-value calculating means performs linear interpolation based on positions of four syncs that surround a position of an object pixel and a position of the object pixel estimated from a recording format to specify a position of the object pixel.

9. A reproducing apparatus according to claim 8, wherein the amplitude-value calculating means specifies a position of the object pixel with the linear interpolation and, then, performs linear interpolation using readout signal values at four points that surround the position of the object pixel to calculate an amplitude value of a position of the object pixel.

10. A reproducing method for reproducing data from a hologram recording medium in which data inserted with syncs at predetermined intervals is recorded in each predetermined page unit by interference fringes of reference light and signal light, the reproducing method comprising:
irradiating the reference light on the hologram recording medium;
receiving diffractive light corresponding to the data recorded on the hologram recording medium, which is obtained by the irradiation of the reference light on the hologram recording medium, and obtaining a readout signal;
detecting, in detecting positions of the syncs that should be inserted in the readout signal obtained in the step of obtaining a readout signal, a position of a detection object sync on the basis of positions of plural syncs selected with the position of the detection object sync as a reference; and
specifying positions of respective recording pixels in the readout signal on the basis of the positions of the respective syncs detected in the step of detecting a position of a detection object sync and calculating amplitude values of the respective pixels.

11. A recording and reproducing apparatus that records data on and reproduces data from a hologram recording medium in which data in each predetermined page unit is recorded by interference fringes of reference light and signal light, the recording and reproducing apparatus comprising:
recording means for performing spatial light modulation corresponding to a data pattern formed by recording data and syncs inserted in the recording data at predetermined intervals to generate the signal light and irradiating the signal light and the reference light on the hologram recording medium to record the data on the hologram recording medium;
reference-light irradiating means for irradiating the reference light on the hologram recording medium;
signal readout means for receiving diffractive light corresponding to the data recorded on the hologram recording medium, which is obtained by the irradiation of the reference light on the hologram recording medium, and obtaining a readout signal;
sync-position detecting means for detecting, in detecting positions of the syncs that should be inserted in the readout signal obtained by the signal readout means, a position of a detection object sync on the basis of positions of plural syncs selected with the position of the object sync as a reference; and
amplitude-value calculating means for specifying positions of respective recording pixels in the readout signal on the basis of the positions of the respective syncs detected by the sync-position detecting means and calculating amplitude values of the respective pixels.

12. A recording and reproducing apparatus according to claim 11, wherein the recording means generates the signal light according to the data pattern generated by inserting the syncs in the recording data such that two-dimensional arrangement intervals thereof are equal.

13. A recording and reproducing apparatus according to claim 11, wherein the recording means generates the signal light according to the data pattern inserted with the respective syncs such that, when a center position of the signal light is set as an insertion position of the syncs, two-dimensional arrangement intervals of the respective syncs are equal with a sync in the center as a reference.

14. A recording and reproducing method for recording data on and reproducing data from a hologram recording medium in which data in each predetermined page unit is recorded by interference fringes of reference light and signal light, the recording and reproducing method comprising:
performing spatial light modulation corresponding to a data pattern formed by recording data and syncs inserted in the recording data at predetermined intervals to generate the signal light and irradiating the signal light and the reference light on the hologram recording medium to record the data on the hologram recording medium;
irradiating the reference light on the hologram recording medium;
receiving diffractive light corresponding to the data recorded on the hologram recording medium, which is obtained by the irradiation of the reference light on the hologram recording medium, and obtaining a readout signal;
detecting, in detecting positions of the syncs that should be inserted in the readout signal obtained in the step of obtaining a readout signal, a position of a detection object sync on the basis of positions of plural syncs selected with the position of the object sync as a reference; and
specifying positions of respective recording pixels in the readout signal on the basis of the positions of the respective syncs detected in the step of detecting a position of a detection object and calculating amplitude values of the respective pixels.

15. A reproducing apparatus that reproduces data from a hologram recording medium in which data inserted with syncs at predetermined intervals is recorded in each predetermined page unit by interference fringes of reference light and signal light, the reproducing apparatus comprising:
a reference-light irradiating unit irradiating the reference light on the hologram recording medium;
a signal readout unit receiving diffractive light corresponding to the data recorded on the hologram recording medium, which is obtained by the irradiation of the reference light on the hologram recording medium, and obtaining a readout signal;
a sync-position detecting unit detecting, in detecting positions of the syncs that should be inserted in the readout signal obtained by the signal readout unit, a position of a detection object sync on the basis of positions of plural syncs selected with the position of the detection object sync as a reference; and
an amplitude-value calculating unit specifying positions of respective recording pixels in the readout signal on the basis of the positions of the respective syncs detected by the sync-position detecting unit and calculating amplitude values of the respective pixels.

16. A recording and reproducing apparatus that records data on and reproduces data from a hologram recording medium in which data in each predetermined page unit is recorded by interference fringes of reference light and signal light, the recording and reproducing apparatus comprising:
a recording unit performing spatial light modulation corresponding to a data pattern formed by recording data and syncs inserted in the recording data at predetermined intervals to generate the signal light and irradiating the signal light and the reference light on the hologram recording medium to record the data on the hologram recording medium;
a reference-light irradiating unit irradiating the reference light on the hologram recording medium;
a signal readout unit receiving diffractive light corresponding to the data recorded on the hologram recording medium, which is obtained by the irradiation of the reference light on the hologram recording medium, and obtaining a readout signal;
a sync-position detecting unit detecting, in detecting positions of the syncs that should be inserted in the readout signal obtained by the signal readout unit, a position of a detection object sync on the basis of positions of plural syncs selected with the position of the object sync as a reference; and
an amplitude-value calculating unit specifying positions of respective recording pixels in the readout signal on the basis of the positions of the respective syncs detected by the sync-position detecting unit and calculating amplitude values of the respective pixels.

* * * * *